(12) United States Patent
Zhang et al.

(10) Patent No.: US 11,476,774 B2
(45) Date of Patent: Oct. 18, 2022

(54) CONTROL METHOD AND CONTROL SYSTEM FOR MODULAR MULTILEVEL CONVERTER AND POWER TRANSMISSION SYSTEM

(71) Applicant: Delta Electronics (Shanghai) Co., Ltd., Shanghai (CN)

(72) Inventors: Yi Zhang, Shanghai (CN); Zhao Wang, Shanghai (CN); Erdong Chen, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 23 days.

(21) Appl. No.: 17/334,812

(22) Filed: May 31, 2021

(65) Prior Publication Data

US 2021/0376759 A1 Dec. 2, 2021

(30) Foreign Application Priority Data

Jun. 1, 2020 (CN) .......................... 202010484132.1

(51) Int. Cl.
*H02M 7/483* (2007.01)
*H02M 1/32* (2007.01)
*H02M 7/219* (2006.01)

(52) U.S. Cl.
CPC ........... *H02M 7/4835* (2021.05); *H02M 1/32* (2013.01); *H02M 7/219* (2013.01)

(58) Field of Classification Search
CPC ....... H02M 7/4835; H02M 1/32; H02M 7/219
See application file for complete search history.

(56) References Cited

U.S. PATENT DOCUMENTS 9,413,260 B1 * 8/2016 Wu .................... H02M 7/4835
11,152,868 B2 * 10/2021 Dallmer-Zerbe ..... H02M 7/483
(Continued)

FOREIGN PATENT DOCUMENTS

CN 102017385 A 4/2011
CN 102916592 A 2/2013
(Continued)

OTHER PUBLICATIONS

R. Marquardt et al., "New Concept for High Voltage-Modular Multilevel Converter", PESC 2004 conference, Aachen, Germany, 2004.

*Primary Examiner* — Rafael O De Leon Domenech
(74) *Attorney, Agent, or Firm* — CKC & Partners Co., LLC

(57) ABSTRACT

Disclosed are a control method and control system for a modular multilevel converter and a power transmission system. The control method comprises: calculating an actual capacitor voltage and a reference capacitor voltage of the sub-module; dividing the plurality of sub-modules into a plurality of modules, wherein reference capacitor voltages of the sub-modules in the same module are the same, and reference capacitor voltages of the sub-modules among different modules are different; obtaining a first voltage sequence and a second voltage sequence; and determining the sub-modules to be switched on or switched off according to charging and discharging states of the sub-modules, the first voltage sequence and the second voltage sequence, until an actual level of the bridge arm is consistent with a desired level, wherein the desired level changes taking an insert value selected from a combination of one or more elements in a collection $\{INTER_k\}$ as a step.

20 Claims, 19 Drawing Sheets

(56) References Cited

U.S. PATENT DOCUMENTS

| | | | |
|---|---|---|---|
| 2015/0207434 A1 | 7/2015 | Wang et al. | |
| 2016/0233762 A1* | 8/2016 | Mathew | H02M 7/4835 |
| 2017/0163171 A1* | 6/2017 | Park | H02M 7/4835 |
| 2021/0058007 A1* | 2/2021 | Hario | H02M 7/53873 |
| 2021/0320587 A1* | 10/2021 | Yu | H02M 7/4833 |

FOREIGN PATENT DOCUMENTS

| | | |
|---|---|---|
| CN | 105897019 A | 8/2016 |
| CN | 104065290 B | 1/2017 |
| CN | 110556880 A | 12/2019 |
| TW | 201911719 A | 3/2019 |

\* cited by examiner ers and Power Transmission System

CROSS-REFERENCE TO RELATED APPLICATIONS

This non-provisional application claims priority under 35 U.S.C. § 119(a) on Patent Application No. 202010484132.1 filed in P.R. China on Jun. 1, 2020, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The disclosure relates to the technical field of power transmission and distribution, and particularly to a control method and control system for a modular multilevel converter, and a power transmission system.

BACKGROUND

Modular Multilevel Converters (MMCs) are proposed and filed for patent by professor R. Marquardt at the earliest, and have advantages of low requirement for consistency of switching devices, low switching frequency, small switching loss, more equivalent level numbers, low harmonic content, and easily for redundant design, so MMCs become an important converter topology in a flexible DC power transmission system.

The MMC may be formed of three phases of A, B and C phases, each phase comprising a bridge arm circuit, for example, the bridge arm circuit may include an upper bridge arm and/or a lower bridge arm, and each of the bridge arms may be formed of an inductor L and N sub-modules connected in series. Each of the sub-modules may be formed of one or more power conversion circuits connected in series, each of the power conversion circuits may comprise a capacitor C, and a corresponding AC output voltage may be fitted by controlling the sub-modules to be switched on or switched off.

A DC bus voltage $U_{dc}$ of the MMC is supported by serially connected capacitors of mutually independent sub-modules. To ensure the quality of a waveform of the AC output voltage, and reduce interphase circulating current and ensure respective power semiconductor devices to bear the same voltage stress, it is necessary to ensure fluctuation of capacitor voltages of the respective sub-modules to be within a certain range.

In a case that the voltage level is high and the number of required sub-modules is large, the MMC can use mixed sub-modules with different voltage levels, such that it is possible to reduce the number of hardware drive circuits and communication lines, simplify the circuit, reduce costs, and improve system reliability. However, for such circuit, the problems of large level jumping, and high Total Harmonic Distortion (THD) shall be solved.

At present, methods for equalizing the capacitor voltages of the power conversion circuits of the MMC are mainly as follows:

One method is to introduce the concepts of half-voltage sub-modules and full-voltage sub-modules. As for the half-voltage sub-modules in this method, one of them is an increased level half-voltage sub-module for supplying level numbers of the system, another two of them are controlled to be voltage equalization half-voltage sub-modules as a whole for participating in control and voltage equalization of the full-voltage sub-modules, and other half-voltage sub-modules are redundant. However, such method does not fully utilize redundancy attribute of the half-voltage sub-modules, and thus the sub-module utilization is low, and voltages of the sub-modules are limited to two electrical levels.

Another method is a voltage equalization control strategy for serially connected sub-modules of different voltage levels, but the method requires each sub-module to be provided with corresponding voltage equalization control loop, and in the case of a huge number of sub-modules of the MMC, the control is complicated.

Therefore, a novel control method and control system capable of realizing voltage equalization control of mixed sub-modules of several different voltage levels in the MMC, and further improving THD at the AC side of the MMC are required.

SUMMARY

In the first aspect, the disclosure provides a control method for a modular multilevel converter, the modular multilevel converter comprising a bridge arm circuit including at least one bridge arm, each of the bridge arms comprising a plurality of sub-modules connected in series, each of the sub-modules comprising one or more power conversion circuits connected in series, and each of the power conversion circuits comprising a capacitor, wherein the control method comprises:

detecting an actual voltage of the capacitor of each of the power conversion circuits in each of the sub-modules, and calculating an actual capacitor voltage of each of the sub-modules;

calculating a reference capacitor voltage of each of the sub-modules according to a reference voltage of the capacitor of each of the power conversion circuits in each of the sub-modules;

dividing the plurality of sub-modules in the bridge arm into R modules according to the reference capacitor voltage, where R is an integer greater than or equal to 1, and wherein reference capacitor voltages of the respective sub-modules in the same module are the same, and reference capacitor voltages of the sub-modules from different modules are different;

sorting, in the same module, the actual capacitor voltages of the respective sub-modules to obtain a first voltage sequence;

normalizing, among different modules, the actual capacitor voltage of each of the sub-modules into a corresponding normalized voltage, and sorting the normalized voltages of all sub-modules in the bridge arms to obtain a second voltage sequence; and determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state within the bridge arm, and the desired level changes taking an insert value selected from a combination of one or more elements in a collection $\{INTER_k\}$ as a step.

In a second aspect, the disclosure further provides a control system for a modular multilevel converter, the modular multilevel converter comprising a bridge arm circuit including at least one bridge arm, each of the bridge arms comprising a plurality of sub-modules connected in series, each of the sub-modules comprising one or more power conversion circuits connected in series, and each of the power conversion circuits comprising a capacitor, wherein the control system comprises:

a detection unit for detecting an actual voltage of the capacitor of each of the power conversion circuits in each of the sub-modules, and calculating an actual capacitor voltage of each of the sub-modules; while calculating a reference capacitor voltage of each of the sub-modules according to a reference voltage of the capacitor of each of the power conversion circuits in each of the sub-modules;

a grouping unit for dividing the plurality of sub-modules in the bridge arm into R modules according to the reference capacitor voltage, where R is an integer greater than or equal to 1, and wherein the reference capacitor voltages of the respective sub-modules in the same module are the same, and reference capacitor voltages of the sub-modules from different modules are different;

a sorting unit for sorting the actual capacitor voltages of the respective sub-modules in the same module to obtain a first voltage sequence; and, among different modules, normalizing the actual capacitor voltage of each of the sub-modules into a corresponding normalized voltage, and sorting the normalized voltages of all sub-modules in the bridge arms to obtain a second voltage sequence; and a modulation algorithm unit for determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state within the bridge arm, and the desired level changes taking an insert value selected from a combination of one or more elements in a collection $\{INTER_k\}$ as a step.

In the third aspect, the disclosure further provides a power transmission system, comprising: a modular multilevel converter comprising a bridge arm circuit including at least one bridge arm, each of the bridge arms comprising a plurality of sub-modules connected in series, each of the sub-modules comprising one or more power conversion circuits connected in series, and each of the power conversion circuits comprising a capacitor; and the control system.

The additional aspects and advantages of the disclosure are partially explained in the below description, and partially becoming apparent from the description, or can be obtained through practice of the disclosure.

BRIEF DESCRIPTION OF THE DRAWINGS

The exemplary embodiments will be described in detail with reference to the accompanying drawings, through which the above and other features and advantages of the disclosure will become more apparent.

DETAILED DESCRIPTION

Figure 1:
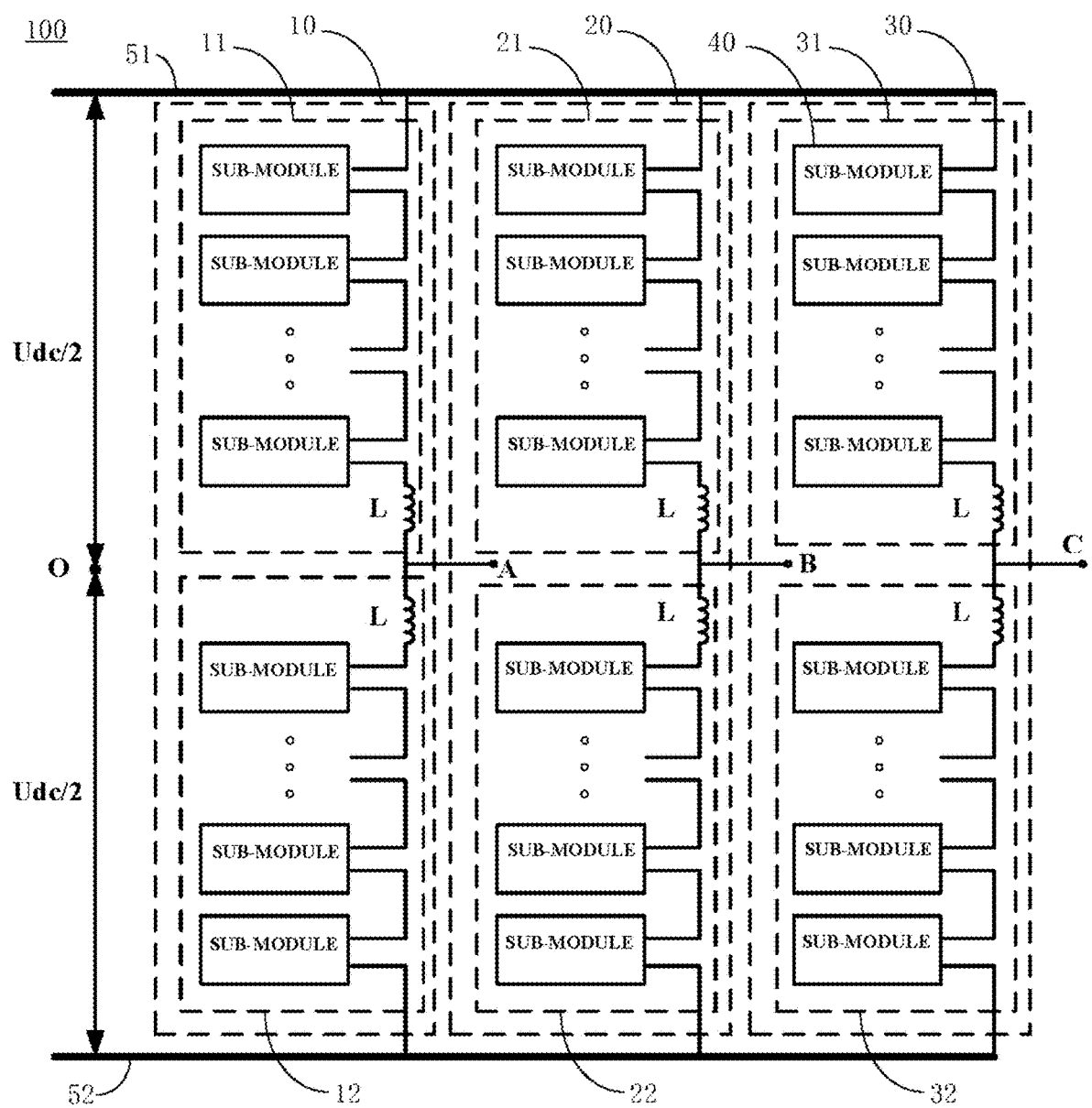
FIG. 1 is a structural diagram of a modular multilevel converter (MMC) according to the disclosure.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this disclosure will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. In addition, the terms "first", "second" and the like in the claims are only used as signs, instead of numeral limitations to objects.

The Modular Multilevel Converter (MMC) of the disclosure includes a bridge arm circuit including at least one bridge arm, and each of the bridge arms includes a plurality of sub-modules connected in series. Each of the sub-modules may include one or more power conversion circuits connected in series, and each of the power conversion circuits may include a capacitor.

As shown in FIG. 1, a preferable Modular Multilevel Converter (MMC) 100 of the disclosure is formed three phases (A phase, B phase and C phase), for example. Each phase may comprise a bridge arm circuit, such as, the bridge arm circuits 10, 20 and 30, and each of the bridge arm circuits 10, 20 and 30 may include upper and lower bridge arms. More specifically, the bridge arm circuit 10 includes an upper bridge arm 11 and a lower bridge arm 12, the bridge arm circuit 20 includes an upper bridge arm 21 and a lower bridge arm 22, and the bridge arm circuit 30 includes an upper bridge arm 31 and a lower bridge arm 32. Each of the bridge arms (11, 12, 21, 22, 31 and 32), for example, may be formed of an inductor L and N sub-modules 40 connected in series.

In the disclosure, AC sides of the A, B and C phases, for example, may be connected to a power grid, while DC sides of the two bridge arms, for example, may be connected to two poles 51 and 52 of DC buses, respectively, wherein $U_{dc}$ is a DC bus voltage between the two poles 51 and 52.

It shall be noticed that each bridge arm circuit also can include only one bridge arm, for example, only one upper bridge arm, or only one lower bridge arm.

Figure 2A:
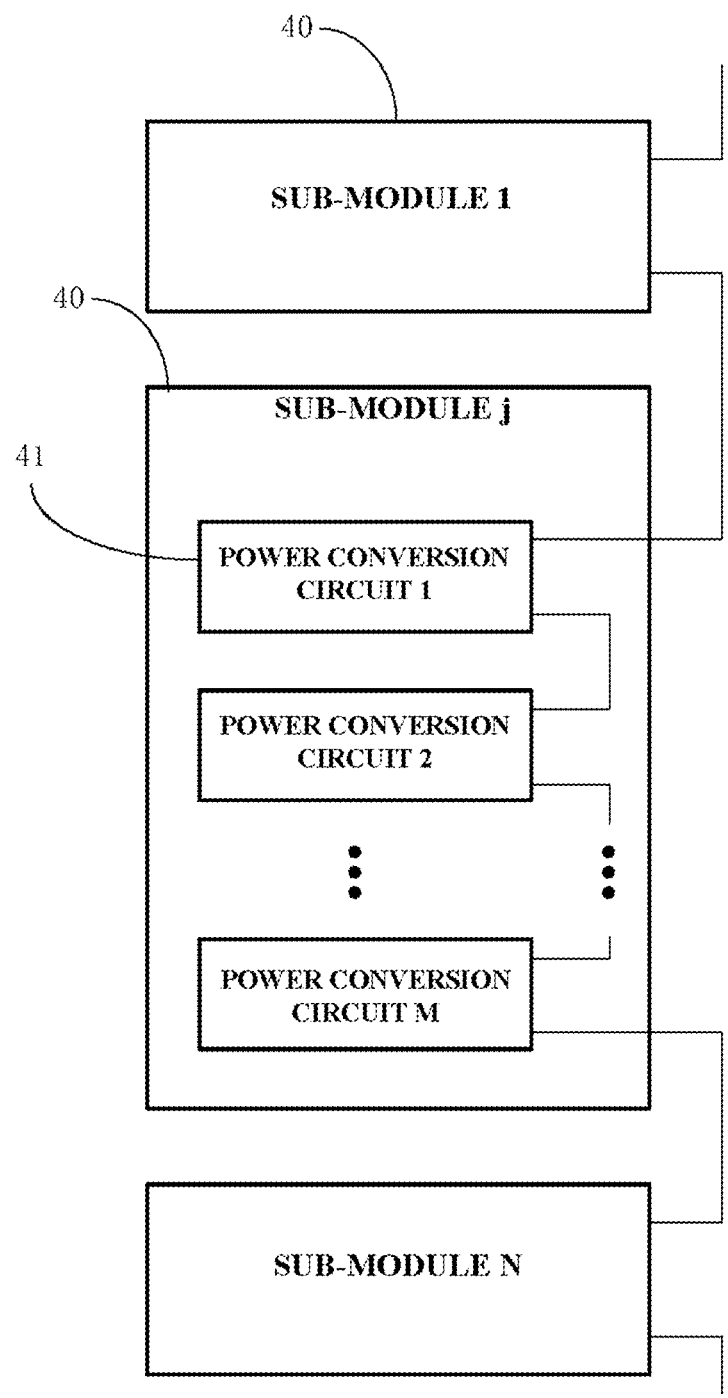
FIG. 2A illustrates a structure of a preferable embodiment of a bridge arm in a bridge arm circuit of FIG. 1, wherein one sub-module of the bridge arm comprises M power conversion circuits.

In the disclosure, as shown in FIG. 2A, each of the sub-modules 40 may include at least M (M≥1) power conversion circuits 41.

Figure 2B:
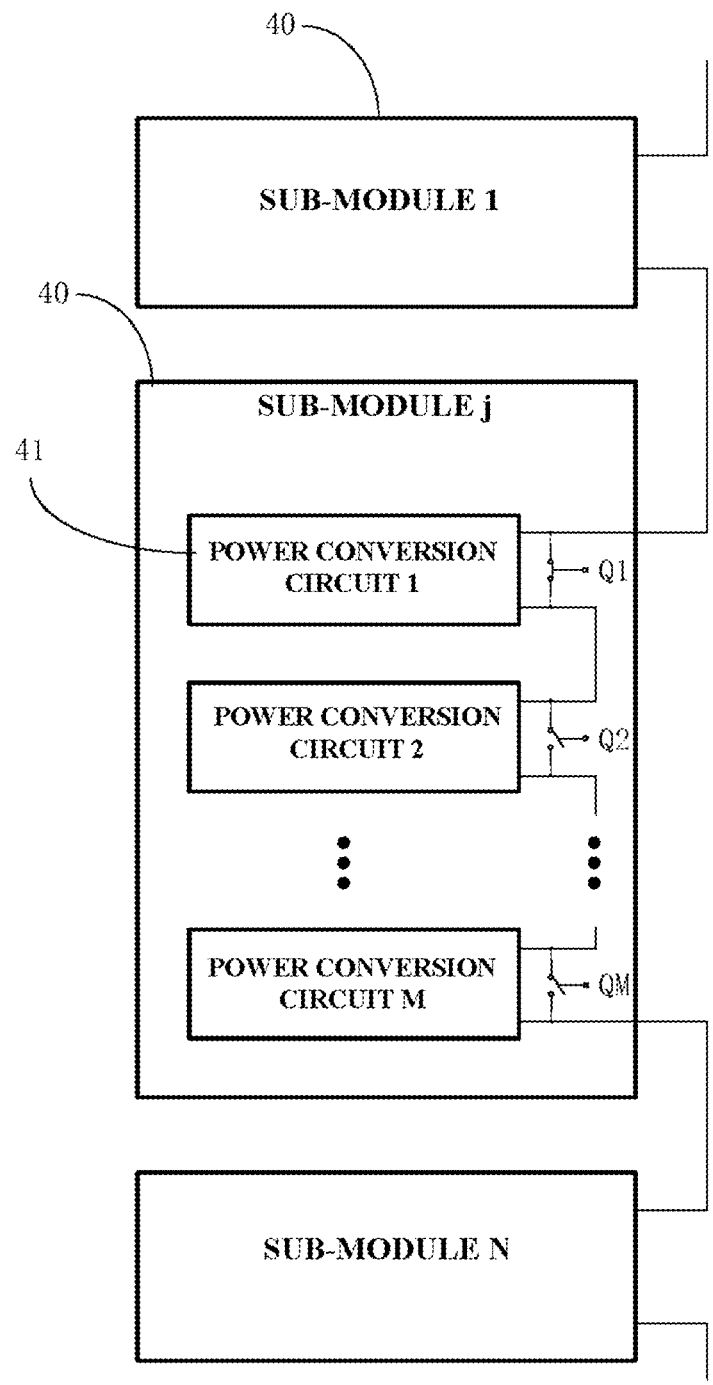
FIG. 2B illustrates a structure of another preferable embodiment of a bridge arm in the bridge arm circuit of FIG. 1, wherein the power conversion circuit of each sub-module is provided with a bypass switch that can realize bypass function.

In the disclosure, as shown in FIG. 2B, the power conversion circuits 41 in each sub-module 40 can be bypassed by parallelly connecting a bypass switch, for example, an output end of each power conversion circuit 41 may be connected in parallel to a switch Q which is normally off. For example, in FIG. 2B, taking the sub-module j for example, output ends of the power conversion circuits 1-M are connected in parallel to switches $Q_1$-$Q_M$, respectively. In the disclosure, the switches can be transistors, IGBTs, mechanical switches or other switches controllable by control signals. Moreover, when the switches are switched to "on", the corresponding power conversion circuits are in a bypass mode, and when the switches are switched to "off", the corresponding power conversion circuits are in a connection mode. In one embodiment, in the same sub-module, all power conversion circuits 41 in the connection mode use the same driving signal.

Figure 3A:
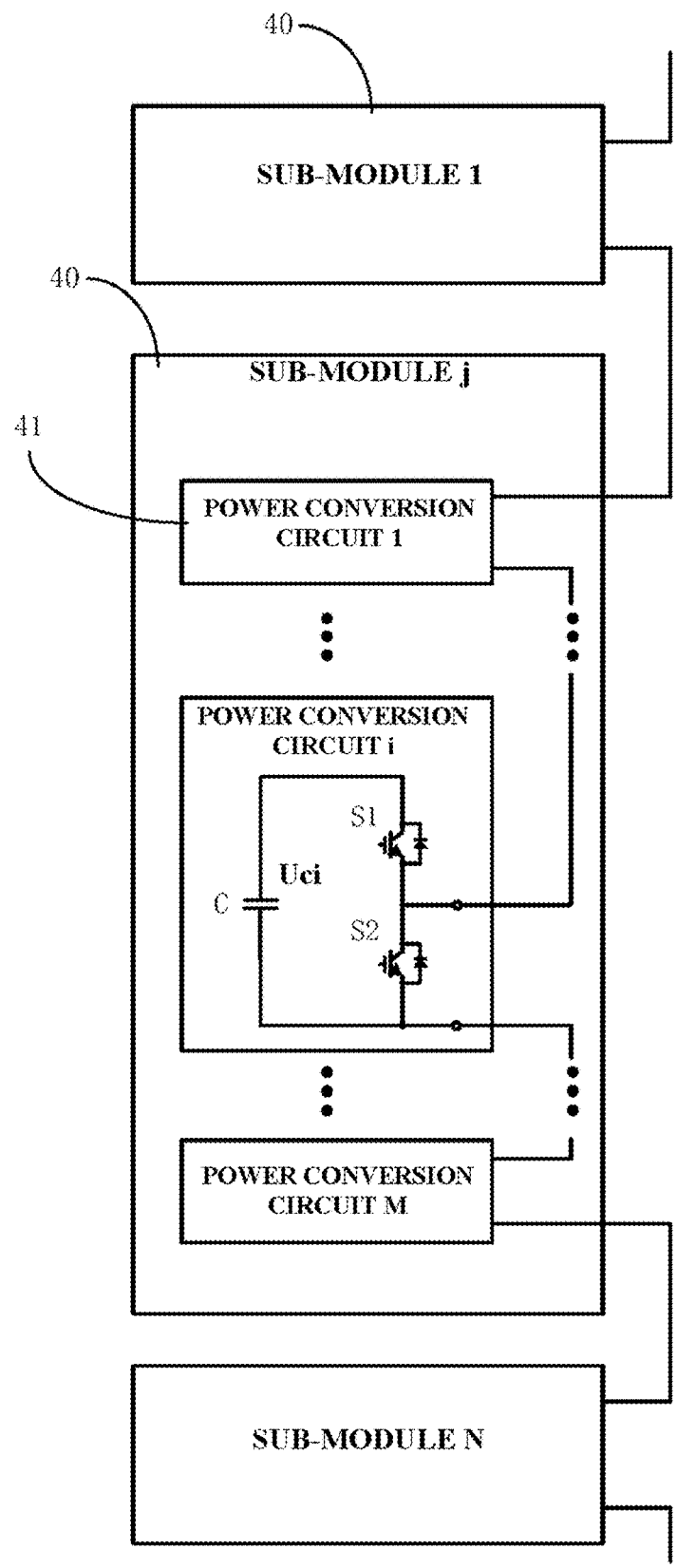
FIG. 3A illustrates a preferable structure of the power conversion circuits according to the disclosure, wherein the power conversion circuits are a half-bridge structure.
Figure 3B:
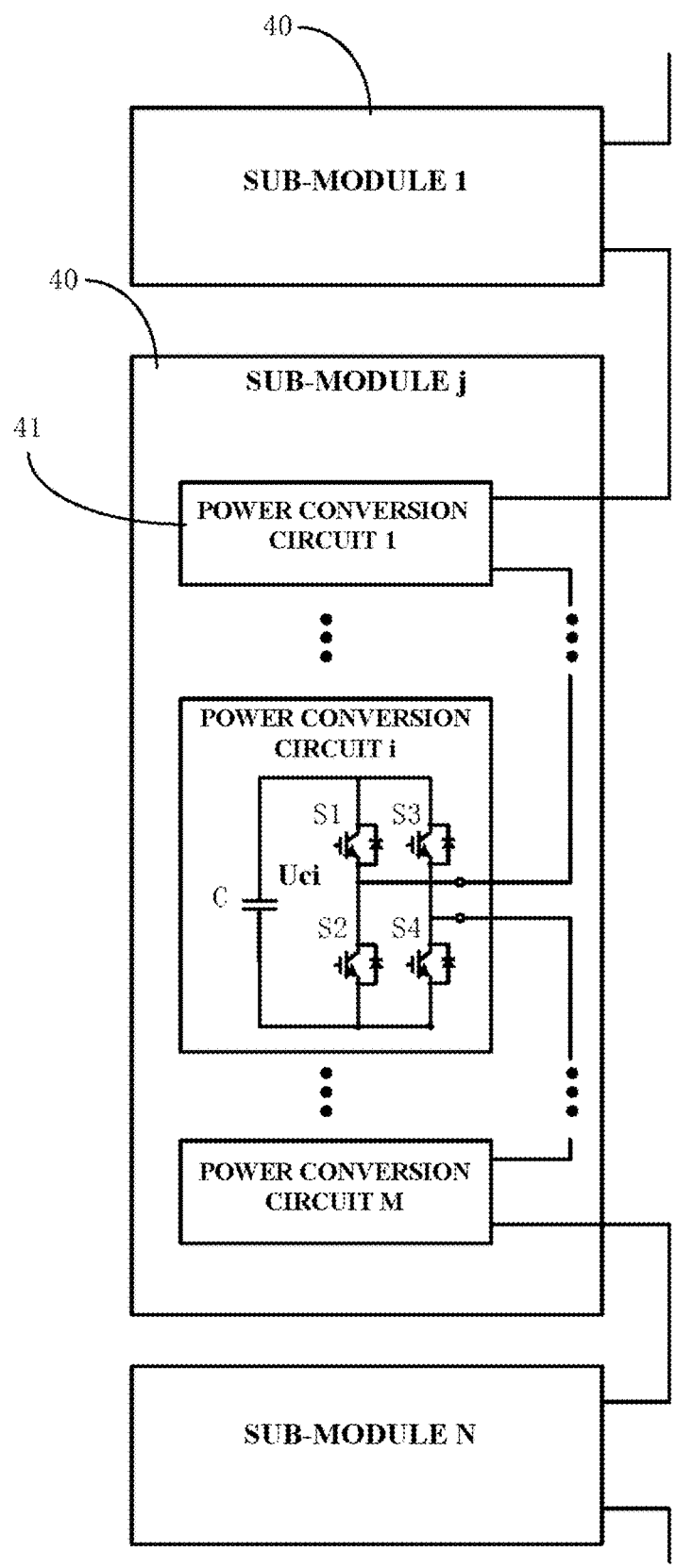
FIG. 3B illustrates another preferable structure of the power conversion circuits according to the disclosure, wherein the power conversion circuits are a full-bridge structure.

In the disclosure, the power conversion circuits 41 can use multiple circuit topologies, for example, a half-bridge structure (shown in FIG. 3A) or a full-bridge structure (shown in FIG. 3B). As shown in FIG. 3A, taking the power conversion circuit i (i.e., the i-th power conversion circuit) for example, the power conversion circuits 41 adopt the half-bridge structure consisting of a capacitor C and power switches S1, S2. As shown in FIG. 3B, taking the power conversion circuit i (i.e., the i-th power conversion circuit) for example, the power conversion circuits 41 adopt the full-bridge structure consisting of a capacitor C and power switches S1, S2, S3 and S4. To facilitate description, the subsequent texts are mainly explained taking the power conversion circuits 41 as the half-bridge structure for example, but the disclosure is not limited thereto.

Figure 3C:
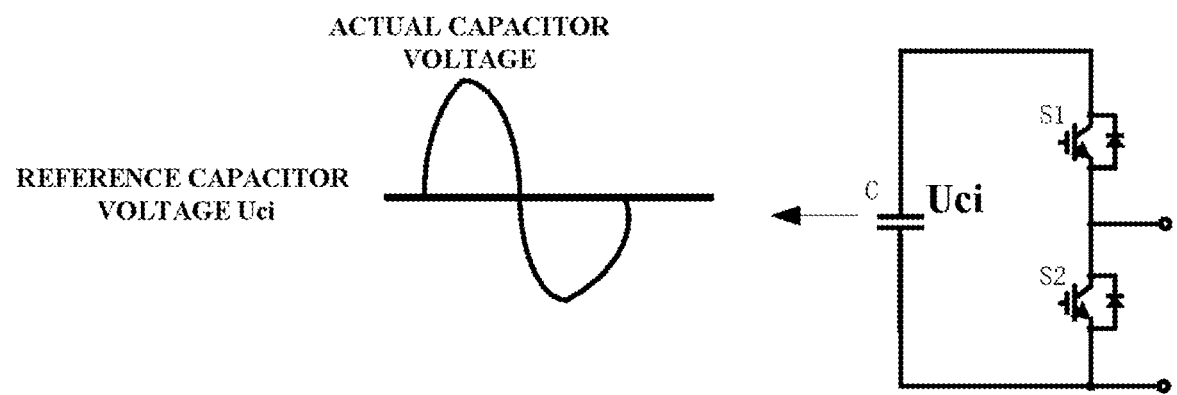
FIG. 3C illustrates a relationship between a reference capacitor voltage and an actual capacitor voltage of the capacitor of the power conversion circuit according to the disclosure.

FIG. 3C illustrates a relationship between a reference capacitor voltage and an actual capacitor voltage of the capacitor C of the power conversion circuit according to the disclosure. In the disclosure, the reference capacitor voltage of the capacitor C of the power conversion circuit is named as $U_{ci}$ (i=1, 2, . . . M, which represents the i-th power conversion circuit). Moreover, the reference capacitor voltages $U_{c1}$, $U_{c2}$ . . . $U_{cM}$ of the M power conversion circuits in each sub-module can be completely the same, and also can be partially the same, or can be totally different. As can be seen from FIG. 3C, the actual capacitor voltage of the capacitor C of the power conversion circuit of the disclosure fluctuates around the reference capacitor voltage.

Figure 4:
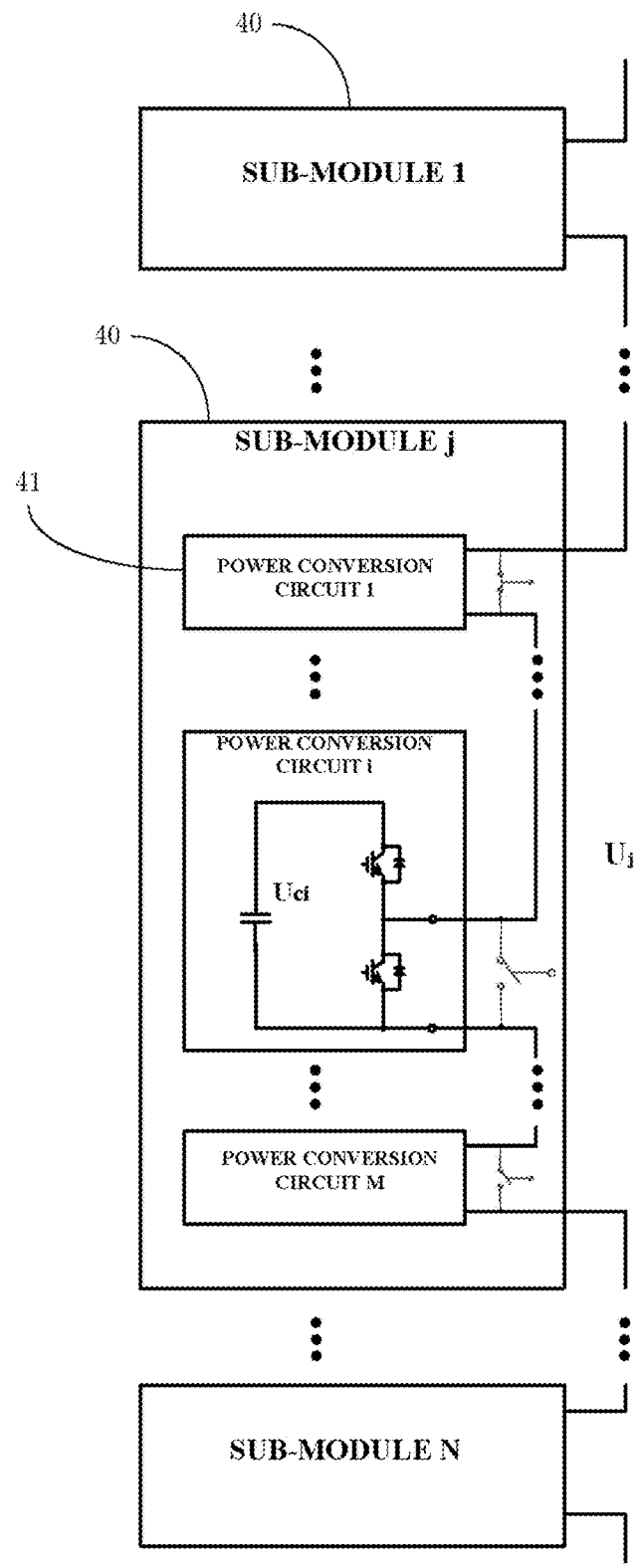
FIG. 4 illustrates different states of the bypass switch of the power conversion circuits in one sub-module of the MMC according to the disclosure, wherein the corresponding power conversion circuits are in a connection mode as the bypass switch is off, and the corresponding power conversion circuits are in a bypass mode as the bypass switch is on, and the reference capacitor voltage of the sub-module is equal to a sum of reference voltages of the capacitors of the power conversion circuits in the connection mode.

As shown in FIG. 4, a sum of the reference capacitor voltages $\Sigma U_{ci}$ of the power conversion circuits in the connection mode within the sub-module j is referred to as the reference capacitor voltage of the sub-module j, and is defined to be $U_j$ (j=1, 2 . . . N, which represents the j-th sub-module). In other words, in the disclosure, the reference capacitor voltage of the sub-module is equal to a sum of reference voltages of the capacitors of the power conversion circuits in the connection mode, i.e., $U_j = \Sigma U_{ci}$, wherein i represents the power conversion circuits in the connection mode.

The disclosure divides the sub-modules with the same reference capacitor voltage in the same bridge arm into one group (also called Module). As shown in below table I, one bridge arm, for example, may include R modules, where R may be an integer greater than or equal to 1, for example. The reference capacitor voltage of the sub-module in the module k is defined to be $U_{Mk}$ (k=1, 2 . . . R, which represents the k-th module), and the actual capacitor voltage of the x-th sub-module in the module k is defined to be $U_{Mk\_x}$ (k=1, 2 . . . R, which represents the k-th module; x=1, 2 . . . , which represents the x-th sub-module in the module). Moreover, the minimum voltage in $U_{M1}$, $U_{M2}$ . . . $U_{MR}$ is defined to be MIN.

TABLE I

| Voltage | | Module | | |
|---|---|---|---|---|
| Reference capacitor voltage of the sub-module | | Module 1 $U_{M1}$ | Module 2 $U_{M2}$ | . . . Module R . . . $U_{MR}$ |
| Actual capacitor voltage of the sub-module | Sub-module voltage 1 | $U_{M1\_1}$ | $U_{M2\_1}$ | . . . $U_{MR\_1}$ |
| | Sub-module voltage 2 | $U_{M1\_2}$ | $U_{M2\_2}$ | . . . $U_{MR\_2}$ |
| | . . . | . . . | . . . | . . . . . . |
| | Sub-module voltage x | $U_{M1\_x}$ | $U_{M2\_x}$ | . . . $U_{MR\_x}$ |

In the disclosure, in the same module, a first voltage sequence can be obtained by sorting the actual capacitor voltages of the respective sub-modules. For example, taking Table I as example, the disclosure can obtain the first voltage sequence by sorting the actual capacitor voltage $U_{Mk\_x}$ of the sub-module inside the k-th module.

In the disclosure, among different modules, a second voltage sequence can be obtained by normalizing the actual capacitor voltage of each of the sub-modules into a corresponding normalized voltage, and sorting the normalized voltages of all sub-modules in the bridge arm. Preferably, for example, a normalized coefficient is calculated according to the reference capacitor voltage of sub-module corresponding to each module, and the actual capacitor voltage of each of the sub-modules is normalized into the corresponding normalized voltage according to the normalized coefficient. More specifically. For example, by calculating a least common multiple of the reference capacitor voltages of the sub-modules of the plurality of modules, the actual capacitor voltage of each of the sub-modules can be normalized into the normalized voltage according to the least common multiple. Of course, it can be understood that in other embodiments, the disclosure also can realize normalization through other normalization method, but is not limited thereto.

For example, taking Table I as example, in the disclosure, STD can be set as the normalized coefficient, and a voltage obtained by multiplying the actual capacitor voltage $U_{Mk\_x}$ of the x-th sub-module inside the k-th module by $STD/U_{Mk}$ times is used as the corresponding normalized voltage, thereby sorting the normalized voltages of all sub-modules in the same bridge arm among the modules to obtain the second voltage sequence. For example, the least common multiple of the reference capacitor voltages $U_{M1}$, $U_{M2}$ . . . $U_{MR}$ of the sub-modules of the R modules can be taken as the normalized coefficient, but the disclosure is not limited thereto.

In the disclosure, an insert value can be used as a changing step of the desired level, and can be selected from a combination of one or more elements in a collection $\{INTER_k\}$. Each of the elements in the collection $\{INTER_k\}$ satisfies formula (1):

$$INTER_k = X_1 * U_{M1} + X_2 * U_{M2} + \ldots + X_i * U_{MR} \quad (1)$$

wherein $U_{MR}$ is the reference capacitor voltage corresponding to the sub-modules in the R-th module, and $X_1$, $X_2$, . . . , $X_i$ are all integers (including positive integers and negative integers). Moreover, $INTER_k$ satisfies $0 < INTER_k \leq \min(U_{M1}, U_{M2}, \ldots, U_{MR})$ (i.e., MIN).

For example, taking Table I as example, assuming $U_{M1}=3$ KV and $U_{M2}=5$ KV, according to the formula (1), INTER_1=1 KV, INTER_2=2 KV and INTER_3=3 KV can be calculated. Moreover, the minimum voltage in $U_{M1}$ and $U_{M2}$ is 3 KV (i.e., MIN=3 KV).

Setting the changing step of the desired level according to the above method, which can control the changing step flexibly, and improve THD at the AC side of the system.

Figure 5:
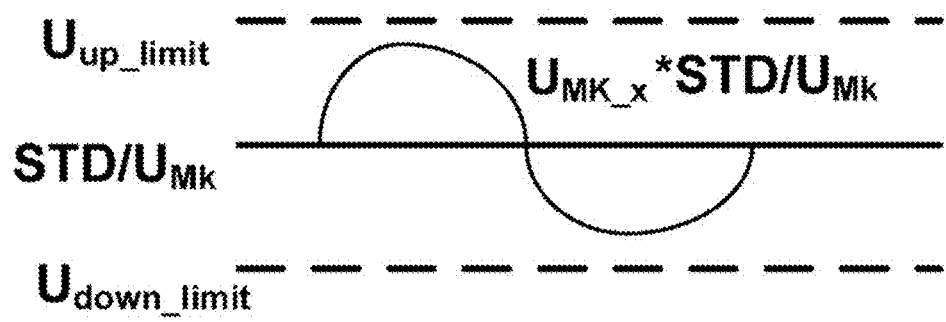
FIG. 5 illustrates a control state of a corresponding normalized voltage of the sub-module according to the disclosure, wherein $STD/U_{Mk}$ times of an actual capacitor voltage $U_{Mk\_x}$ (i.e., $U_{Mk\_x}*STD/U_{Mk}$) of the x-th sub-module inside the k-th module is controlled within a certain range of voltage upper limit and voltage lower limit.

As shown in FIG. 5, the purpose of the disclosure is to control the normalized voltage of the x-th sub-module inside the k-th module within a preset range of the voltage upper limit and the voltage lower limit. To be specific, for example, $STD/U_{Mk}$ times of the actual capacitor voltage $U_{Mk\_x}$ of the x-th sub-module of the k-th module (i.e., $U_{Mk\_x} * STD/U_{Mk}$) is controlled within a certain range of voltage upper and lower limits, i.e., controlled between a voltage upper limit $U_{up\_limit}$ and a voltage lower limit $U_{down\_limit}$.

Figure 6A:
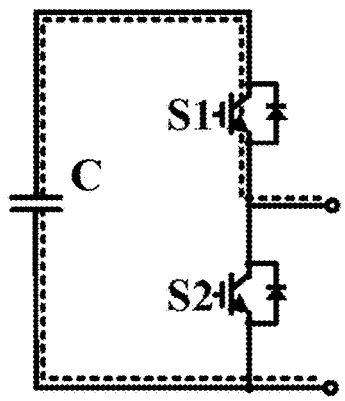
FIG. 6A illustrates a preferable switch-on state of the power conversion circuit according to the disclosure, wherein the sub-modules are also in the switch-on state.

FIG. 6A illustrates a switch-on state of the power conversion circuit taking the half-bridge structure as example according to the disclosure, wherein a case that the power switch S1 is turned "on" and the power switch S2 is turned "off" is referred to as "switching on of the power conversion circuit", and a current flow path in the power conversion circuit is shown by a dashed line in the figure. Since same driving signal is used for all power conversion circuits in the connection mode in the same sub-module, the sub-module is also in a switch-on state, i.e., referred to as "switching on of the sub-module".

Figure 6B:
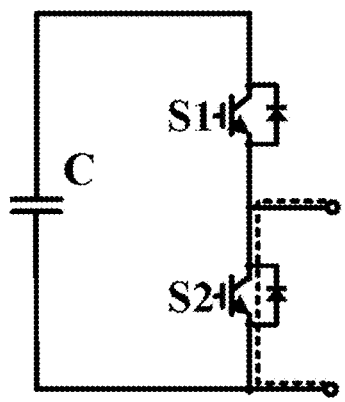
FIG. 6B illustrates a preferable switch-off state of the power conversion circuit according to the disclosure, wherein the sub-modules are also in the switch-off state.

FIG. 6B illustrates a switch-off state of the power conversion circuit taking the half-bridge structure as example according to the disclosure, wherein a case that the power switch S2 is turned "on" and the power switch S1 is turned "off" is referred to as "switching off of the power conversion circuit", and a current flow path in the power conversion circuit is shown by a dashed line in the figure. Since same driving signal is used for all power conversion circuits in the connection mode use in the same sub-module, the sub-module is also in the switch-off state, i.e., referred to as "switching off of the sub-module".

Figure 7A:
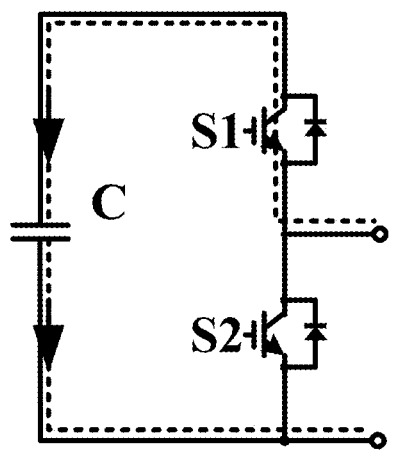
FIG. 7A illustrates a preferable charging state of the power conversion circuit according to the disclosure, wherein the corresponding sub-module is also in the charging state.

FIG. 7A illustrates a charging state of the power conversion circuit taking the half-bridge structure as example according to the disclosure, here, in the switch-on state, a current (shown by a dashed line in FIG. 7A) makes the capacitor C of the power conversion circuit in a charging state, i.e., referred to as "charging of the power conversion circuit". Since same driving signal is used for all power conversion circuits in the connection mode in the same sub-module, the sub-module is also in the charging state, i.e., referred to as "charging of the sub-module".

Figure 7B:
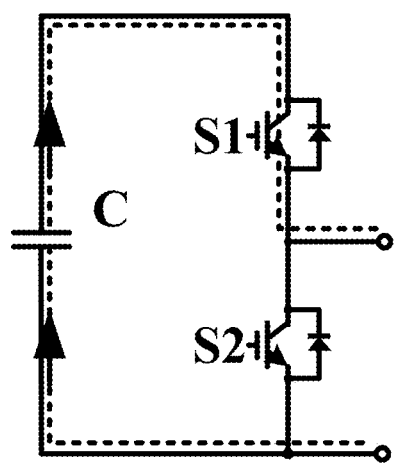
FIG. 7B illustrates a preferable discharging state of the power conversion circuit according to the disclosure, wherein the sub-modules are also in the discharging state.

FIG. 7B illustrates a discharging state of the power conversion circuit taking the half-bridge structure as example according to the disclosure, here, in the switch-on state, a current (shown by a dashed line in FIG. 7B) makes the capacitor C of the power conversion circuit in a discharging state, i.e., referred to as "discharging of the power conversion circuit". Since same driving signal is used for all power conversion circuits in the connection mode in the same sub-module, the sub-module is also in the discharging state, i.e., referred to as "discharging of the sub-module".

Figure 8:
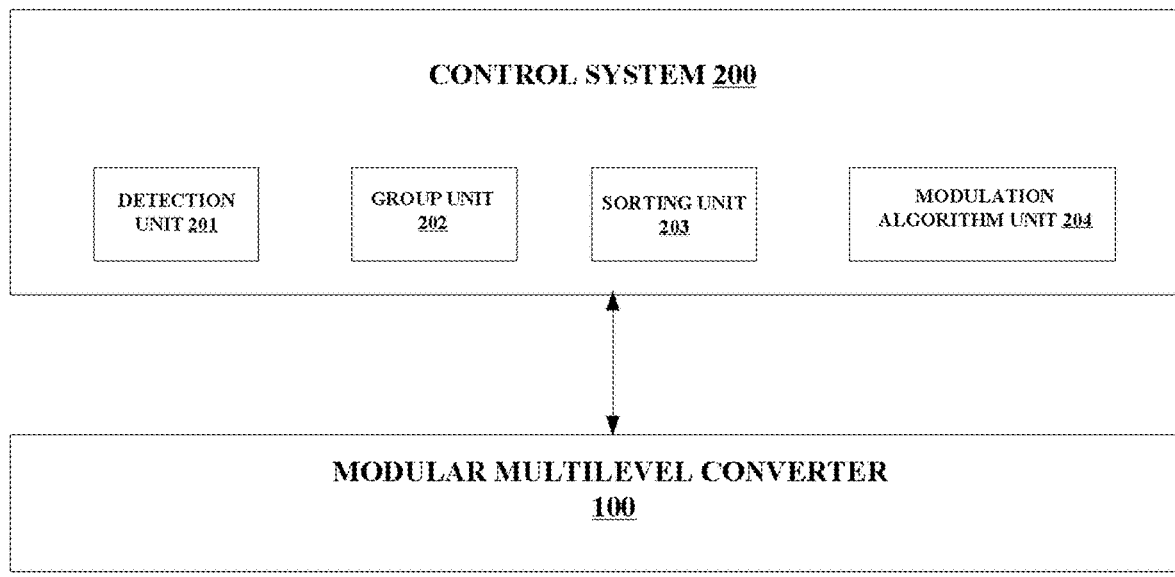
FIG. 8 is a structural diagram of a power transmission system according to the disclosure, wherein the power transmission system comprises a modular multilevel converter (MMC) and a control system.

As shown in FIG. 8, a power transmission system of the disclosure may include the modular multilevel converter (MMC) 100 and a control system 200. Structure of the modular multilevel converter (MMC) 100, for example, may be the structure shown in FIG. 1. The control system 200 is coupled to the modular multilevel converter 100, and controls the modular multilevel converter 100.

In the disclosure, the control system 200, for example, may further include a detection unit 201, a grouping unit 202, a sorting unit 203 and a modulation algorithm unit 204.

The detection unit 201 is configured for detecting an actual voltage of the capacitor of each of the power conversion circuits in each of the sub-modules, and calculating an actual capacitor voltage of each of the sub-modules; while calculating a reference capacitor voltage of each of the sub-modules according to a reference voltage of the capacitor of each of the power conversion circuits in each of the sub-modules.

The grouping unit 202 is configured for dividing all sub-modules in the bridge arm into R modules according to the reference capacitor voltage, where R is an integer greater than or equal to 1, and reference capacitor voltages of the respective sub-modules in the same module are the same, and reference capacitor voltages of the sub-modules among different modules are different.

The sorting unit 203 is configured for sorting, in the same module, the actual capacitor voltages of the respective sub-modules to obtain a first voltage sequence; and for, among different modules, normalizing the actual capacitor voltage of each of the sub-modules into a corresponding normalized voltage, and sorting the normalized voltages of all sub-modules in the bridge arm to obtain a second voltage sequence.

The modulation algorithm unit 204 is configured for determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state within the bridge arm, and the desired level changes taking an insert value selected from a combination of one or more elements in a collection $\{INTER_k\}$ as a step.

Figure 9:
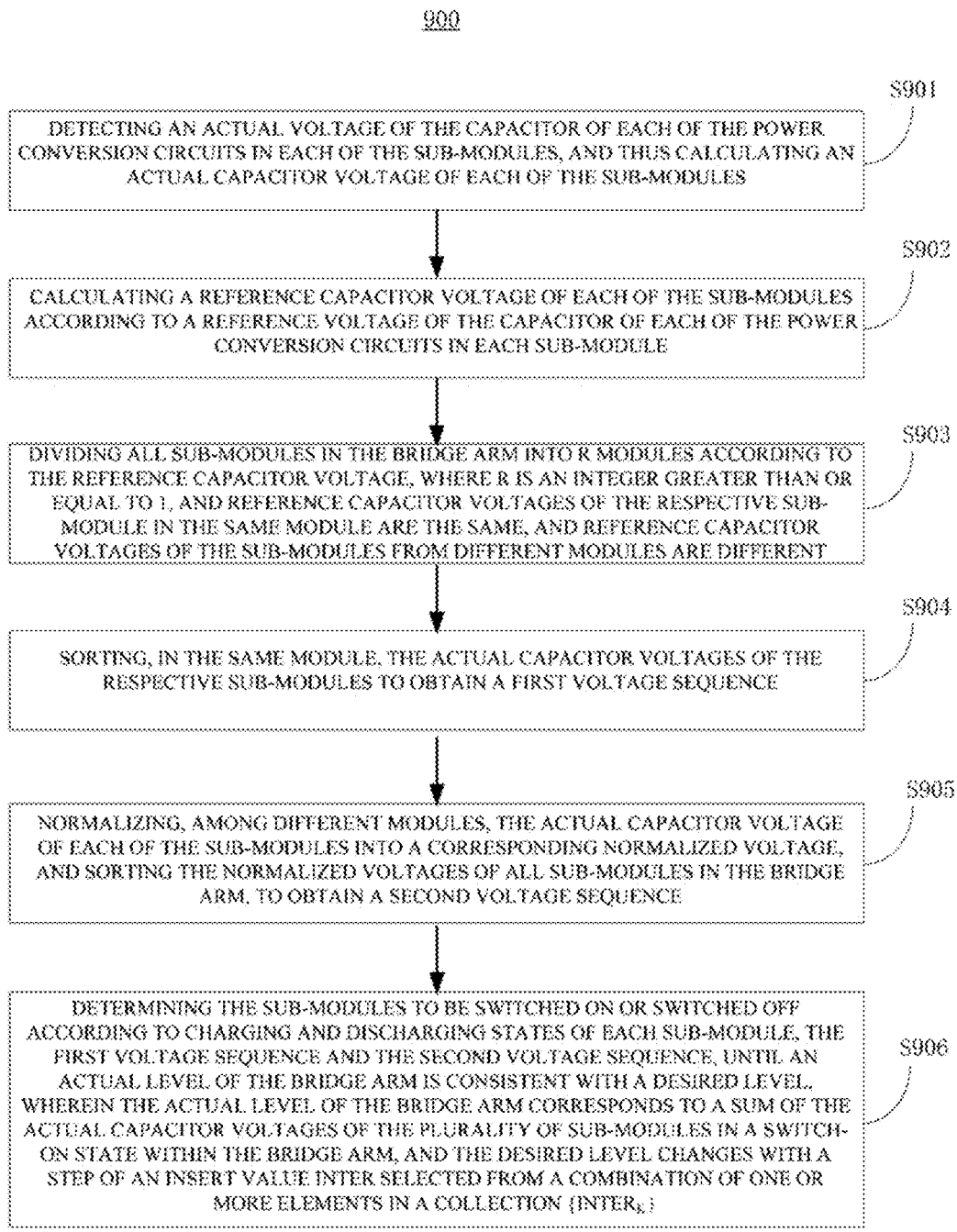
FIG. 9 is a schematic diagram of a control method for a modular multilevel converter (MMC) according to the disclosure.

Correspondingly, as shown in FIG. 9, the control method for a modular multilevel converter (MMC) mainly comprises:

Step S901, detecting an actual voltage of the capacitor of each of the power conversion circuits in each of the sub-modules, and thus calculating an actual capacitor voltage of each of the sub-modules;

Step S902, calculating a reference capacitor voltage of each of the sub-modules according to a reference voltage of the capacitor of each of the power conversion circuits in each sub-module;

Step S903, dividing all sub-modules in the bridge arm into R modules according to the reference capacitor voltage, where R is an integer greater than or equal to 1, and reference capacitor voltages of the respective sub-module in the same module are the same, and reference capacitor voltages of the sub-modules from different modules are different;

Step S904, sorting, in the same module, the actual capacitor voltages of the respective sub-modules to obtain a first voltage sequence;

Step S905, normalizing, among different modules, the actual capacitor voltage of each of the sub-modules into a corresponding normalized voltage, and sorting the normalized voltages of all sub-modules in the bridge arm, to obtain a second voltage sequence; and Step S906, determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state within the bridge arm, and the desired level changes with a step of an insert value INTER selected from a combination of one or more elements in a collection $\{INTER_k\}$.

Preferably, in the disclosure, the step of determining the sub-modules to be switched on or switched off according to the charging and discharging states of each sub-module, the first voltage sequence and the second voltage sequence includes following operations.

In a case that an initial level of the bridge arm is less than the desired level, if the sub-modules are in charging state, selecting the sub-module with a minimum normalized voltage to switch on according to the second voltage sequence, or if the sub-modules are in discharging state, selecting the sub-module with a maximum normalized voltage to switch on according to the second voltage sequence;

In a case that the initial level of the bridge arm is greater than the desired level, if the sub-modules are in charging state, selecting the sub-module with a maximum normalized voltage to switch off according to the second voltage sequence; or if the sub-modules are in discharging state, selecting the sub-module with a minimum normalized voltage to switch off according to the second voltage sequence.

Preferably, in the disclosure, after determining the sub-modules to be switched on, the method may further include following steps.

After switching on, obtaining a calculated level of the bridge arm according to the actual capacitor voltages of the sub-modules in the switch-on state. In a case that the calculated level is less than the desired level, if the sub-modules are in charging state, continuing to select the sub-module with a minimum normalized voltage to switch on according to the second voltage sequence, until the actual level of the bridge arm is greater than or equal to the desired level; or if the sub-modules are in discharging state, continuing to select the sub-module with a maximum normalized voltage to switch on according to the second voltage sequence, until the actual level of the bridge arm is greater than or equal to the desired level. In particular, in a cast that the actual level of the bridge arm is greater than the desired level, following operations may be performed.

In a case that the calculated level is greater than the desired level, if the sub-modules are in charging state, selecting, according to the first voltage sequence and the second voltage sequence, at least one sub-module with higher actual capacitor voltage in at least one module to switch off, or selecting at least one sub-module with lower actual capacitor voltage in at least one module to switch on while selecting at least one sub-module with higher actual capacitor voltage in at least one module to switch off, or if the sub-modules are in discharging state, selecting, according to the first voltage sequence and the second voltage sequence, at least one sub-module with lower actual capacitor voltage in at least one module to switch off, or selecting at least one sub-module with higher actual capacitor voltage in at least one module to switch on while selecting at least one sub-module with lower actual capacitor voltage in at least one module to switch off. In a case that the actual level of the bridge arm is equal to the desired level, ending switching on and switching off control of the sub-modules.

For example, in a case that the calculated level is greater than the desired level, if the sub-modules are in charging state, the sub-module with a maximum actual capacitor voltage in the module with the minimum reference capacitor voltage may be selected to switch off according to the first voltage sequence and the second voltage sequence, or in one embodiment, the sub-module with a maximum actual capacitor voltage in the module with the higher reference capacitor voltage also may be selected to switch off while selecting the sub-module with a minimum actual capacitor voltage in the module with a lower reference capacitor voltage to switch on according to the first voltage sequence and the second voltage sequence, such that the actual level of the bridge arm is equal to the desired level. If the sub-modules are in discharging state, the sub-module with a minimum actual capacitor voltage in the module with a minimum reference capacitor voltage may be selected to switch off according to the first voltage sequence and the second voltage sequence, or in one embodiment, the sub-module with a minimum actual capacitor voltage in the module with the high reference capacitor voltage also may be selected to switch off while selecting the sub-module with a maximum actual capacitor voltage in the module with the low reference capacitor voltage to switch on according to the first voltage sequence and the second voltage sequence, such that the actual level of the bridge arm is equal to the desired level. In a case that the actual level of the bridge arm is equal to the desired level, the switching on and switching off control of the sub-modules is ended.

In another embodiment, in the disclosure, after determining the sub-modules to be switched off, the method also may further include following steps.

After switching off, obtaining a calculated level of the bridge arm according to the actual capacitor voltages of the sub-modules in the switch-on state. In a cast that the calculated level is greater than the desired level, if the sub-modules are in charging state, continuing to select the sub-module with a maximum normalized voltage to switch off according to the second voltage sequence, until the actual level of the bridge arm is less than or equal to the desired level. If the sub-modules are in discharging state, continuing to select the sub-module with a minimum normalized voltage to switch off according to the second voltage sequence, until the actual level of the bridge arm is less than or equal to the desired level. In particular, in a case that the actual level of the bridge arm is less than the desired level, following operations may be performed.

In a case that the calculated level is less than the desired level, if the sub-modules are in charging state, selecting, according to the first voltage sequence and the second voltage sequence, at least one sub-module with lower actual capacitor voltage in at least one module to switch on, or selecting at least one sub-module with low actual capacitor voltage in at least one module to switch on while selecting at least one sub-module with higher actual capacitor voltage in at least one module to switch off, if the sub-modules are in discharging state, selecting according to the first voltage sequence and the second voltage sequence, at least one sub-module with high actual capacitor voltage in at least one module to switch on, or selecting at least one sub-module with high actual capacitor voltage in at least one module to switch on while selecting at least one sub-module with lower actual capacitor voltage in at least one module to switch off according to the first voltage sequence and the second voltage sequence. in a case that the actual level of the bridge arm is equal to the desired level, ending switching on and switching off control of the sub-modules.

For example, in a case that the calculated level is less than the desired level, if the sub-modules are in charging, the sub-module with minimum actual capacitor voltage in the module with minimum reference capacitor voltage may be selected to switch on according to the first voltage sequence and the second voltage sequence, or in one embodiment, the sub-module with minimum actual capacitor voltage in the module with higher reference capacitor voltage also may be selected to switch on while selecting the sub-module with maximum actual capacitor voltage in the group with lower reference capacitor voltage to switch off according to the first voltage sequence and the second voltage sequence. If the sub-modules are in discharging, the sub-module with maximum actual capacitor voltage in the module with the minimum reference capacitor voltage may be selected to switch on according to the first voltage sequence and the second voltage sequence, or in one embodiment, the sub-module with maximum actual capacitor voltage in the module with higher reference capacitor voltage also may be selected to switch on while selecting the sub-module with minimum actual capacitor voltage in the module with lower reference capacitor voltage to switch off according to the first voltage sequence and the second voltage sequence.

In a case that the actual level of the bridge arm is equal to the desired level, the switching on and switching off control of the sub-modules is ended.

Preferably, in order to realize better voltage equalization control effect, and ensure capacitor voltages of all sub-modules within an allowable voltage range, in the disclosure, after determining the sub-modules to be switched on or switched off according to the charging and discharging states of each sub-module, the first voltage sequence and the second voltage sequence, the method also may further include following steps: in a case that the normalized voltage of one of the plurality of sub-modules is greater than a voltage upper limit or less than a voltage lower limit, selecting at least one of the remaining of the plurality of sub-modules according to the charging and discharging states of the sub-module, the first voltage sequence and the second voltage sequence, to replace such sub-module, such that the actual level of the bridge arm keeps constant.

More preferably, the step of replacement may include following operations.

If the sub-modules are in charging, when the normalized voltage of one of the plurality of sub-modules in the switch-on state is greater than the voltage upper limit, switching off such sub-module, and selecting at least one of the remaining of the plurality of sub-modules according to the first voltage sequence and the second voltage sequence, to replace such sub-module, such that the actual level of the bridge arm keeps constant;

If the sub-modules are in charging, when the normalized voltage of one of the plurality of sub-modules in a switch-off state is less than the voltage lower limit, switching on such sub-module, and selecting at least one of the remaining of the plurality of sub-modules according to the first voltage sequence and the second voltage sequence to replace such sub-module, such that the actual level of the bridge arm keeps constant;

If the sub-modules are in discharging, when the normalized voltage of one of the plurality of sub-modules in the switch-on state is less than the voltage lower limit, switching off such sub-module, and selecting at least one of the remaining of the plurality of sub-modules according to the first voltage sequence and the second voltage sequence, to replace such sub-module, such that the actual level of the bridge arm keeps constant;

If the sub-modules are in discharging, when the normalized voltage of one of the plurality of sub-modules in the switch-off state is greater than the voltage upper limit, switching on such sub-module, and selecting at least one of the remaining of the plurality of sub-modules according to the first voltage sequence and the second voltage sequence, to replace such sub-module, such that the actual level of the bridge arm keeps constant.

Figure 10A:
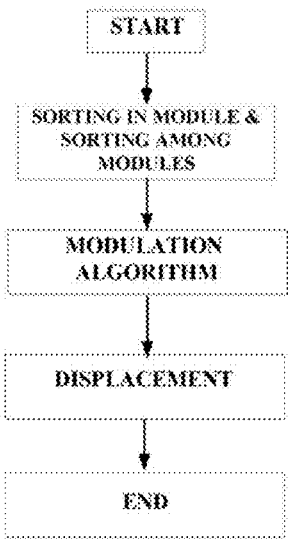
FIG. 10A is flow diagram of a preferable control method for a modular multilevel converter (MMC) according to the disclosure.

FIG. 10A illustrates flows of a preferable method for controlling a modular multilevel converter (MMC) according to the disclosure, wherein the flows are mainly formed of three parts: sorting in the module and sorting among the modules, modulation algorithm and replacement. Sorting in the module and sorting among the modules have been described in detail above, so no repetition here.

Figure 10B:
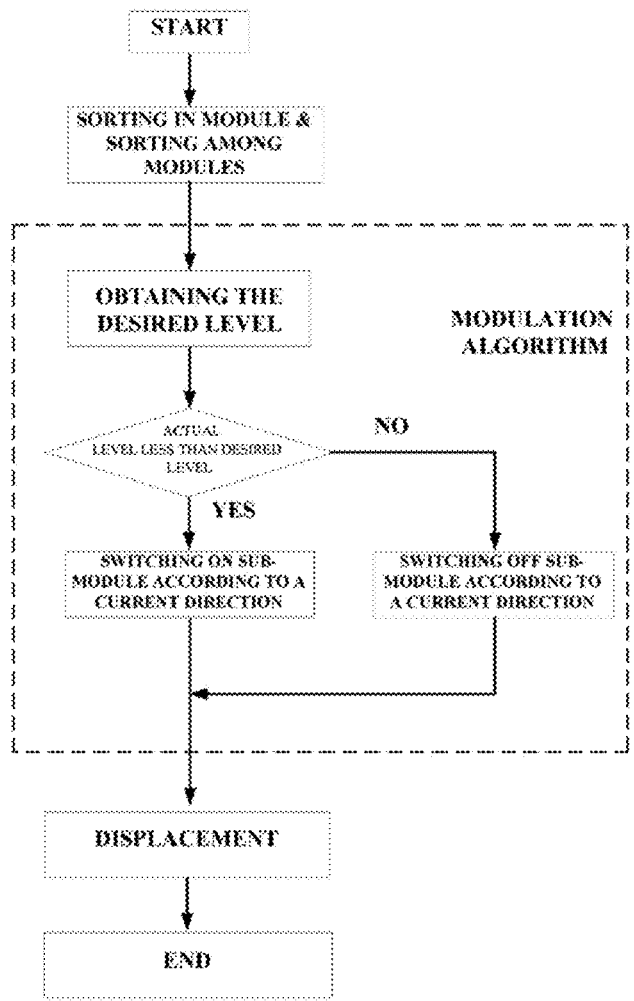
FIG. 10B illustrates flow diagram of a preferable embodiment of a modulation algorithm step in FIG. 10A.

FIG. 10B further illustrates flows of a preferable embodiment of a modulation algorithm step in FIG. 10A. Firstly, the desired level is obtained, and in a case that the actual level is less than the desired level, sub-modules that should be switched on is determined according to charging and discharging of the sub-modules, the first voltage sequence and the second voltage sequence; in a case the actual level is greater than the desired level, sub-modules that should be switched off is determined according to charging and discharging of the sub-modules, the first voltage sequence and the second voltage sequence.

Figure 10C:
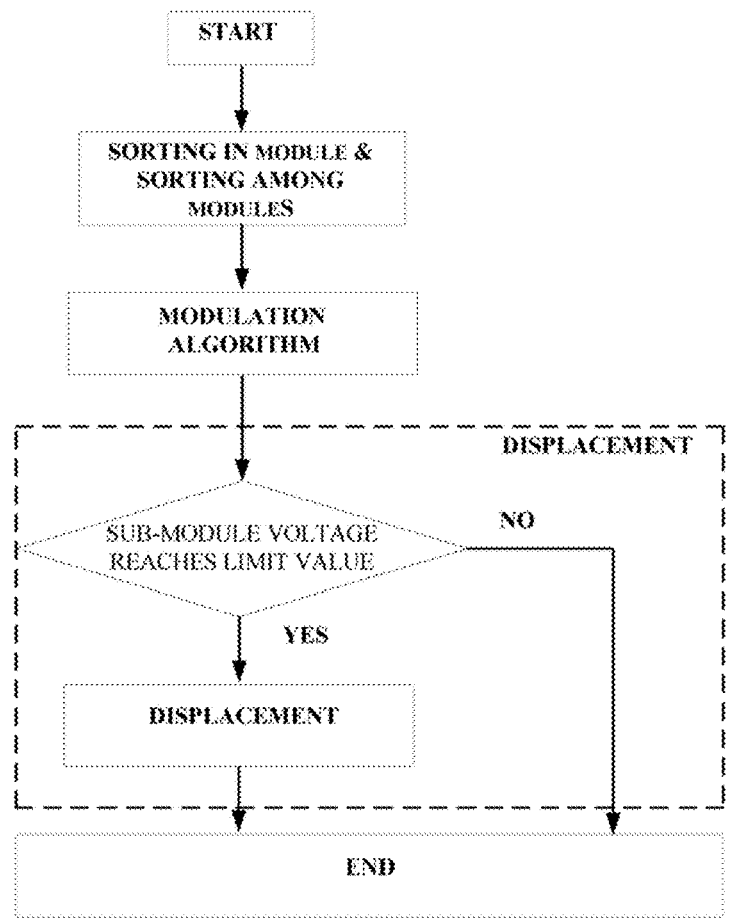
FIG. 10C illustrates flow diagram of a preferable embodiment of a replacement step in FIG. 10A.

FIG. 10C further illustrates flows of a preferable embodiment of a replacement step in FIG. 10A. The switch-on or switch-off state of sub-modules with the normalized voltages greater than the voltage upper limit $U_{up\_limit}$ (or less than the voltage lower limit $U_{down\_limit}$) and the sub-modules with lower (or higher) normalized voltages are exchanged according to whether the corresponding normalized voltages of the sub-modules exceed the voltage upper limit $U_{up\_limit}$ or the voltage lower limit $U_{down\_limit}$, charging and discharging state of the sub-modules, the second voltage sequence and the first voltage sequence.

Figure 11A:
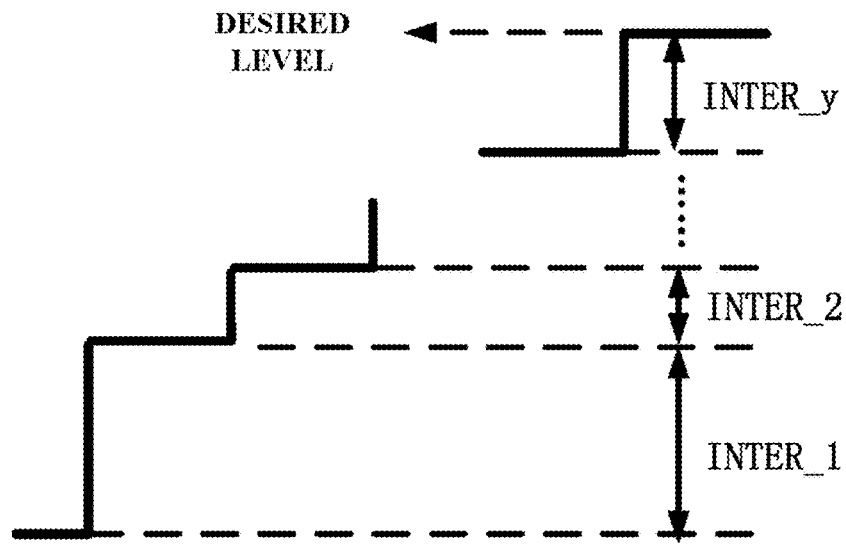
FIG. 11A illustrates a changing mode of an increased desired level in the modulation algorithm step according to the disclosure.
Figure 11B:
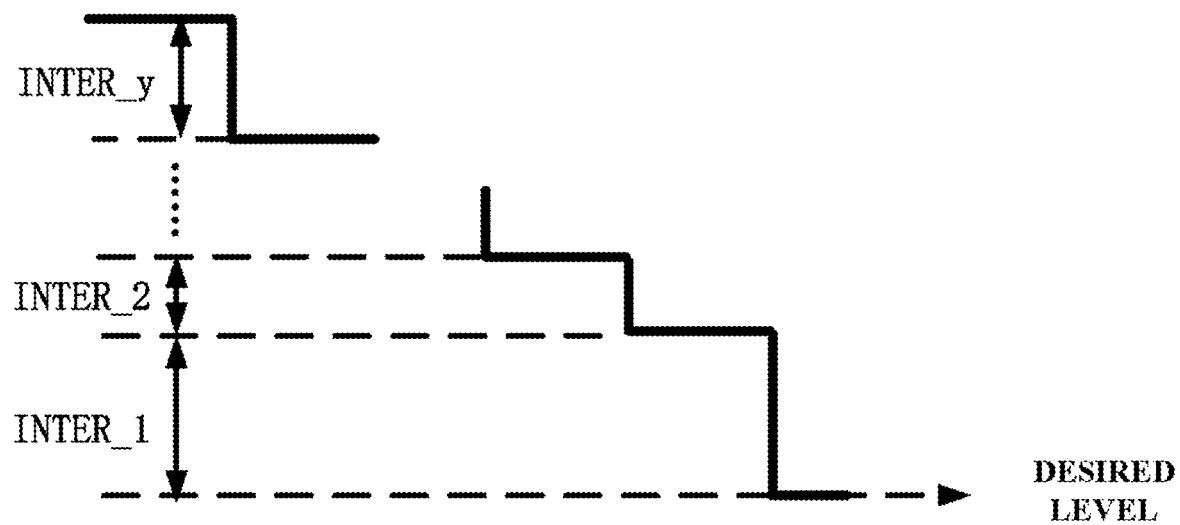
FIG. 11B illustrates a changing mode of a decreased desired level in the modulation algorithm step according to the disclosure.

FIGS. 11A and 11B respectively illustrate changing modes of the increased desired level and the decreased desired level in the modulation algorithm step according to the disclosure. In the disclosure, the final object of the modulation algorithm step is to enable the actual level of the bridge arm to be consistent with the desired level. Moreover, no matter whether the level increases or decreases, changing step of the desired level is based on the insert value INTER, and the insert value INTER is variable.

Figure 11C:
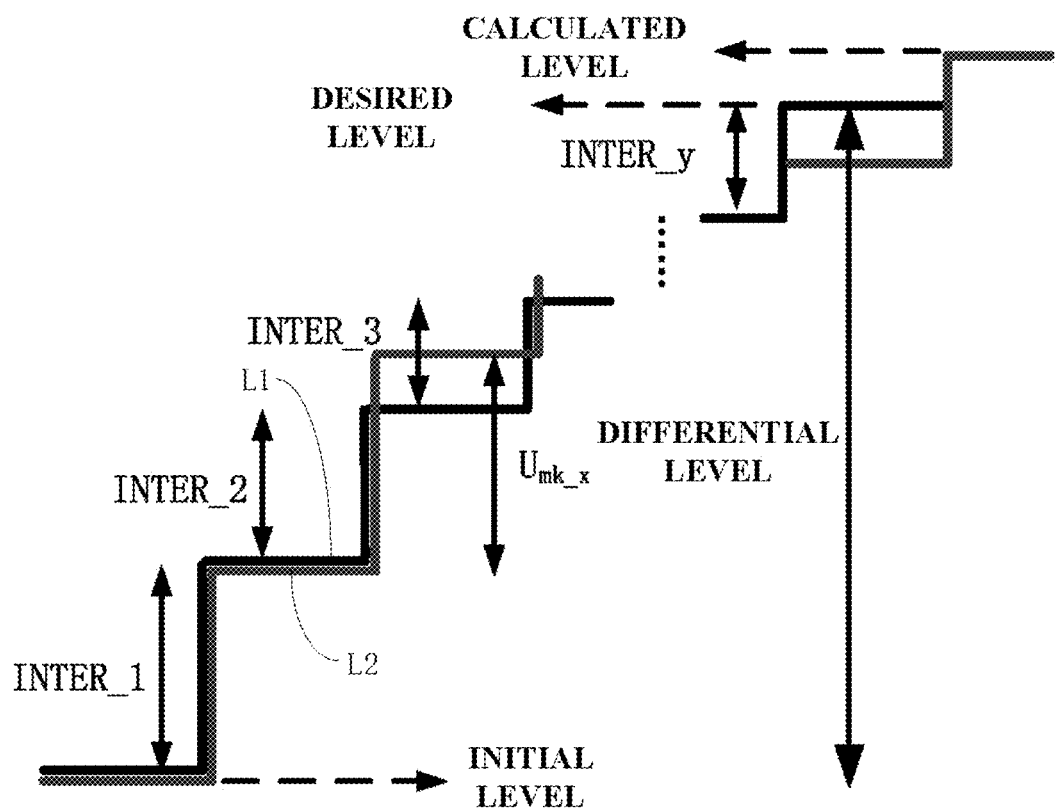
FIG. 11C illustrates a preferable level changing mode in the modulation algorithm step according to the disclosure, wherein line L1 represents the desired level and changing mode of the desired level, line L2 represents changing mode of an actual level of the bridge arm from an initial level to a calculated level, and the desired level changes with a step of INTER.
Figure 11D:
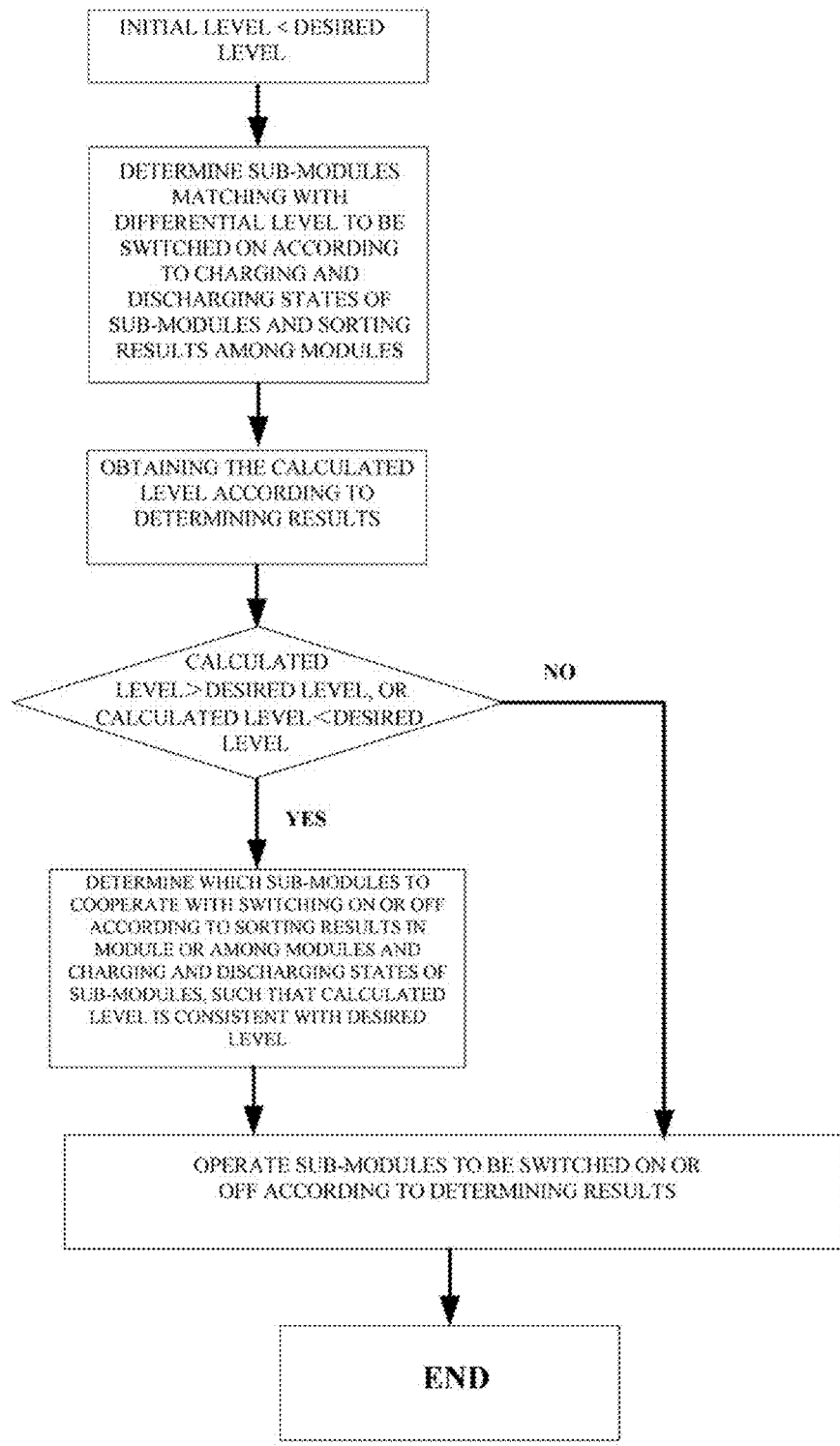
FIG. 11D is flow diagram of modulation algorithm corresponding to the changing mode shown in FIG. 11C.
Figure 11E:
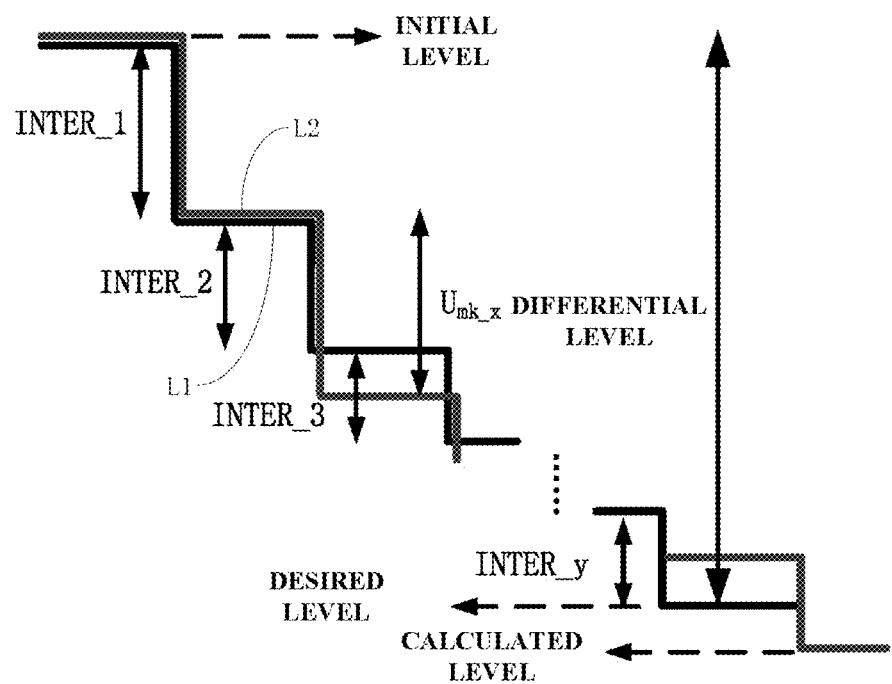
FIG. 11E illustrates another preferable level changing mode in the modulation algorithm step according to the disclosure, wherein line L1 represents the desired level and changing mode of the desired level, line L2 represents changing mode of an actual level of the bridge arm from an initial level to a calculated level, and the desired level changes with a step of INTER.

FIGS. 11C and 11E respectively illustrate two different level changing modes in the modulation algorithm step according to the disclosure, wherein line L1 represents the desired level and changing mode of the desired level, line L2 represents changing of the actual level from an initial level to a calculated level, and the desired level changes taking INTER as a step. Moreover, in the modulation algorithm step, a difference between the initial level and the desired level is referred to as a differential level.

In the modulation algorithm step of the disclosure, there are several methods to switch on or switch off the sub-modules according to charging and discharging of the sub-modules, the first voltage sequence and the second voltage sequence. For example, the following methods may be comprised of: (1) determining according to value of the initial level and the desired level, when the initial level is less than the desired level, switching on the sub-modules matching with the differential level, and when the initial level is greater than the desired level, switching off the sub-modules matching with the differential level; (2) re-determining sub-modules to be switched on or switched off merely according to value of the desired level. Hereinafter the method (1) is explained for example, but the disclosure shall not be limited thereto.

As shown in FIG. 11D, if the initial level is less than the desired level, firstly, the sub-modules matching with the differential level are determined to be switched on according to the second voltage sequence and the charging and discharging states of the sub-modules, and the calculated level is obtained according to the determined results. However, since the reference capacitor voltages of the sub-modules among different modules may not be equal to the insert value INTER, the calculated level may not be consistent with the desired level, resulting in a calculated level is greater than or equal to the desired level. Therefore, an adjustment need to be performed according to the first voltage sequence or the second voltage sequence and the charging and discharging states of the sub-modules cooperating with switching on or switching off some sub-modules, such that the actual level of the bridge arm is consistent with the desired level finally.

Figure 11F:
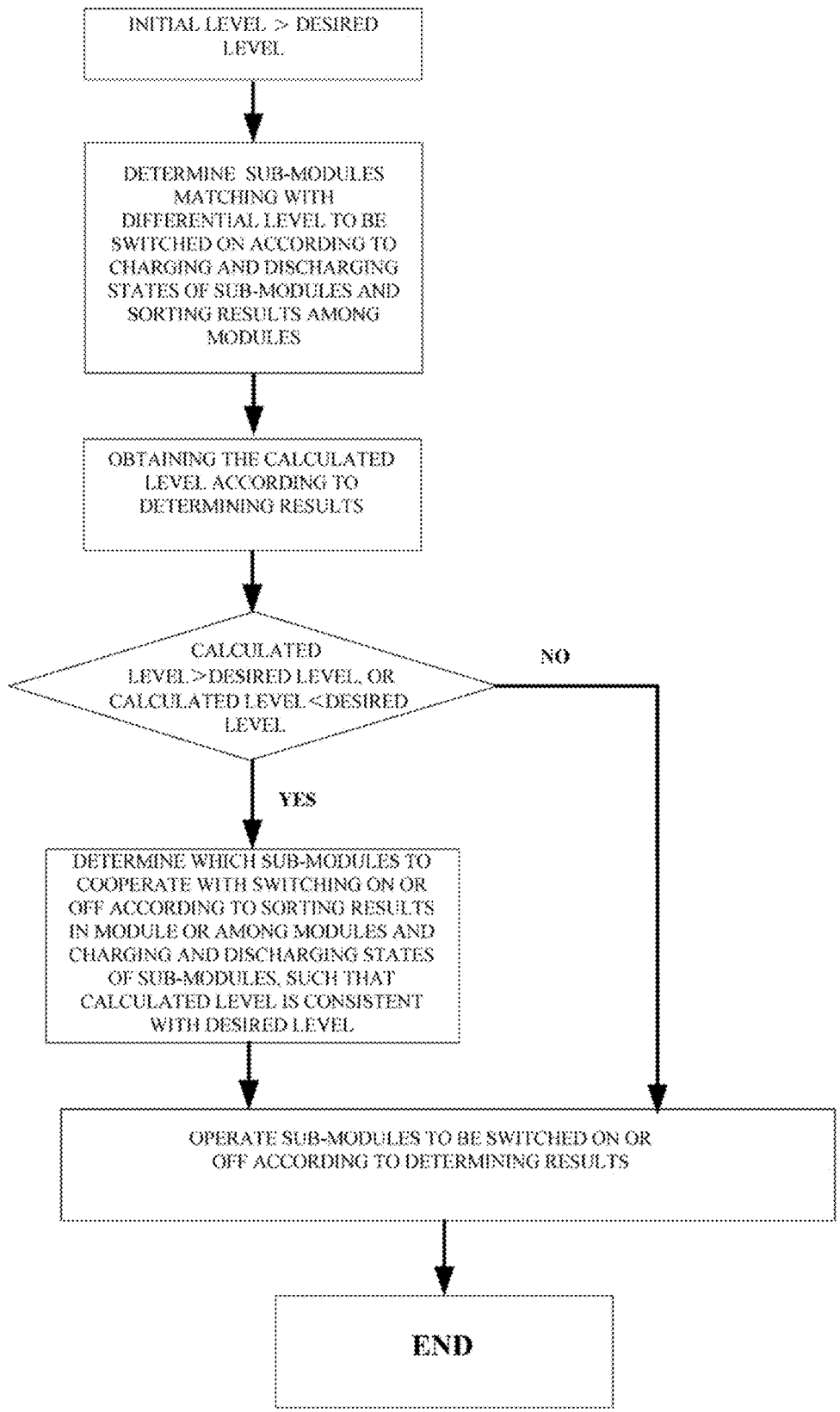
FIG. 11F is flow diagram of modulation algorithm corresponding to the changing mode shown in FIG. 11E.

As shown in FIG. 11F, if the initial level is greater than the desired level, firstly, the sub-modules marching with the differential level to be switched off are determined according to the second voltage sequence and the charging and discharging states of the sub-modules, and the calculated level is obtained according to the determined results. However, since the reference capacitor voltages of the sub-modules among different modules may not be equal to the insert value INTER, the calculated level may not be consistent with the desired level, resulting in a calculated level is greater than or less than the desired level. Therefore, an adjustment need to be performed according to the first voltage sequence or the second voltage sequence and the charging and discharging states of the sub-modules cooperating with switching on or switching off some sub-modules, such that the actual level of the bridge arm is consistent with the desired level finally.

Figure 12A:
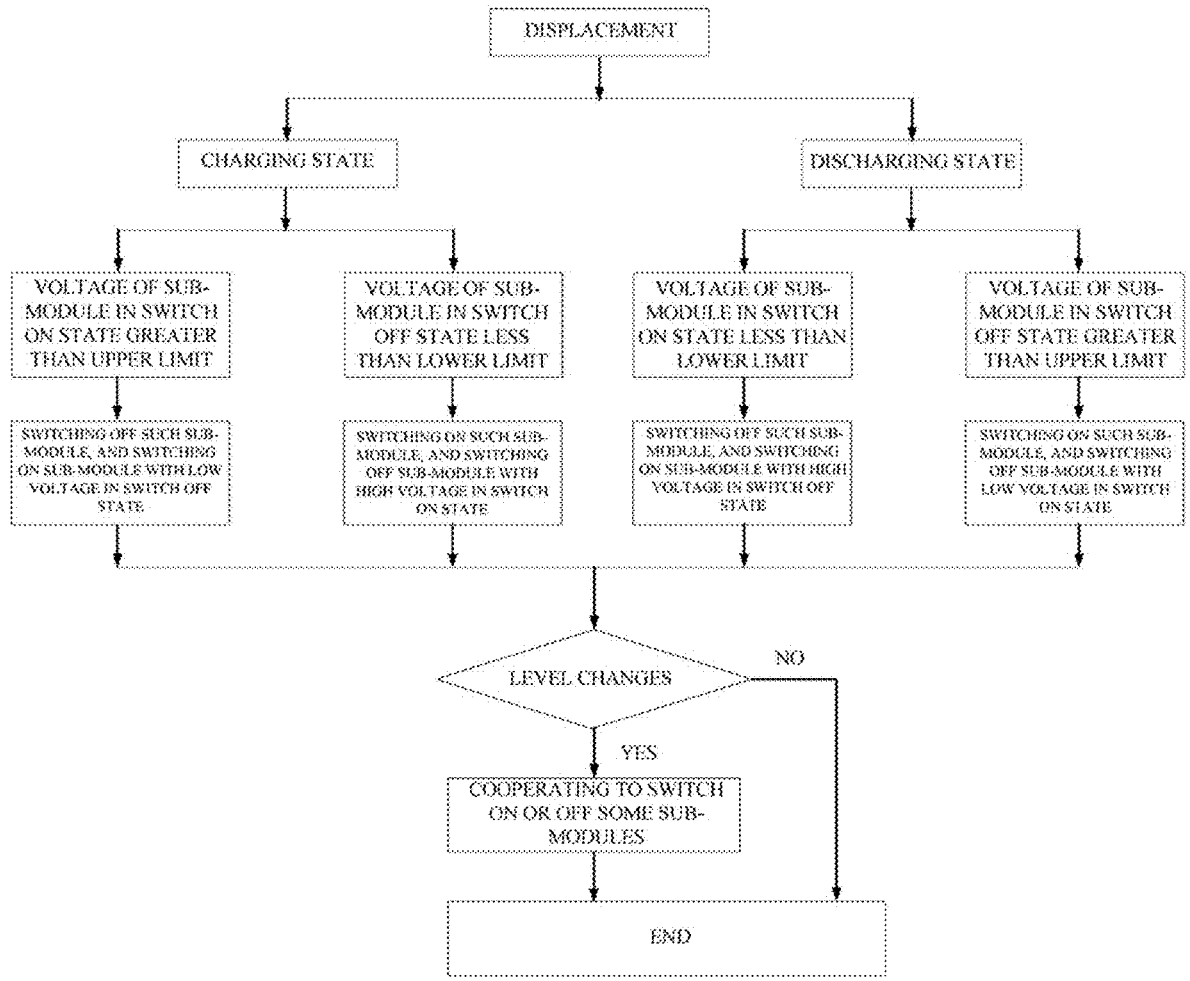
FIG. 12A is flow diagram of the replacement step according to the disclosure.

FIG. 12A illustrates flows of the replacement step according to the disclosure. (1) Assuming that the sub-module is in charging (i.e., the sub-module is in a charging state), if the normalized voltage corresponding to the sub-module in the switch-on state is greater than the voltage upper limit $U_{up\_limit}$, such sub-module is switched off, and other sub-modules with low normalized voltages in the switch-off state are switched on according to the second voltage sequence, while ensuring the actual level of the bridge arm to keep constant; (2) assuming that the sub-module is in charging (i.e., the sub-module is in a charging state), if the normalized voltage corresponding to the sub-module in the switch-off state is less than the voltage lower limit $U_{down\_limit}$, such sub-module is switched in, and other sub-modules with high normalized voltages in the switch-on state are switched off according to the second voltage sequence, while ensuring the actual level of the bridge arm to keep constant; (3) assuming that the sub-module is in discharging (i.e., the sub-module is in a discharging state), if the normalized voltage corresponding to the sub-module in the switch-on state is less than the voltage lower limit $U_{down\_limit}$, such sub-module is switched off, and other sub-modules with high normalized voltages in the switch-off state are switched on according to the second voltage sequence, while ensuring the actual level of the bridge arm to keep constant; (4) assuming that the sub-module is in discharging (i.e., the sub-module is in a discharging state), if the normalized voltage corresponding to the sub-module in the switch-off state is greater than the voltage upper limit $U_{up\_limit}$, such sub-module is switched on, and other sub-modules with low normalized voltages in the switch-on state are switched off according to the second voltage sequence, while ensuring the actual level of the bridge arm to keep constant.

Figure 12B:
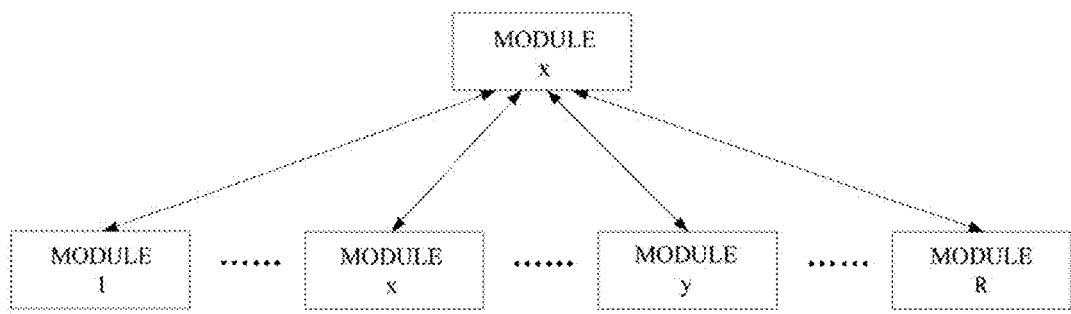
FIG. 12B is a schematic diagram of effect produced by a replacement step shown in FIG. 12A.

As shown in FIG. 12B, the above four cases will produce the following two effects: (1) when the switch-on or switch-off state of sub-modules inside the module (for example, inside the module x) are exchanged, the level does not change, and replacement ends; (2) when switch-on or switch-off state of sub-modules among the modules (for example, the module x and the module y) are exchanged, some sub-modules need to be further switched on or switched off, such that the actual level of the bridge arm keeps constant.

First Example: hereinafter taking R=2 (i.e., total two modules: module 1 and module 2), $U_{M1}$=1K, $U_{M2}$=2 KV, the normalized coefficient STD=2 KV and INTER_1=1 KV as example to describe how to increase level numbers of the system, and reduce THD of the system through the control method of the disclosure is explained in detail.

Step 1: assuming that in one bridge arm, the number of sub-modules in the module 1 is M1, the number of sub-modules in the module 2 is M2, the reference capacitor voltage of the sub-modules in the module 1 is $U_{M1}$=1 KV, and the reference capacitor voltage of the sub-modules in the module 2 is $U_{M2}$=2 KV, and thus MIN=1 KV, STD=2 KV and INTER_1=1 KV, and the voltage upper limit is set as $U_{up\_limit}$, and the voltage lower limit is set as $U_{down\_limit}$.

Step 2: sorting the actual capacitor voltage $U_{M1\_x}$ (x=1, 2 . . . M1, which represents the x-th sub-module in the module 1) of the M1 sub-modules in the module 1 to obtain the first voltage sequence.

Step 3: sorting the actual capacitor voltage $U_{M2\_x}$ (x=1, 2 . . . M2, which represents the x-th sub-module in the module 2) of the M2 sub-modules in the module 2 to obtain the first voltage sequence.

Step 4: normalizing the actual capacitor voltage $U_{M1\_x}$ or $U_{M2\_x}$ of the M1+M2 sub-modules into a corresponding normalized voltage according to the normalized coefficient STD, i.e., multiplying $U_{M1\_x}$ by STD/$U_{M1}$ to obtain 2*$U_{M1\_x}$, and multiplying $U_{M2\_x}$ by STD/$U_{M2}$ to obtain 1*$U_{M2\_x}$, thereby sorting the normalized voltages of the M1+M2 sub-modules among the modules to obtain the second voltage sequence.

Step 5: generating the desired level taking 1 KV(INTER_1) as the step;

Step 6: obtaining the desired level according to closed-loop control, wherein the desired level changes by taking INTER_1=1 KV as the step, determined the value of the initial level and the desired level, and if the initial level is less than the desired level, executing step 7; if the initial level is greater than the desired level, executing step 8; if the initial level is equal to the desired level, executing step 9;

Step 7: selecting the sub-module matching with the differential level to switch on according to the charging and discharging states of the sub-modules and the second voltage sequence; after switching on, obtaining the calculated level according to the actual capacitor voltage of the switched in sub-module; when the calculated level is greater than or less than the desired level, continuing to determine the sub-modules to be switched on or switched out according to the first voltage sequence, the second voltage sequence and the charging and discharging state of the sub-modules, until the actual level of the bridge arm is equal to the desired level; when the calculated level is equal to the desired level, ending switching on and switching off control of the sub-modules, and executing step 9;

Step 8: selecting the sub-module matching with the differential level to switch off according to the charging and discharging states of the sub-modules and the second voltage sequence; after switching off, obtaining the calculated level according to the actual capacitor voltage of the switch-on sub-module; when the calculated level is greater than or less than the desired level, continuing to determine the sub-modules to be switched on or switched off according to the first voltage sequence, the second voltage sequence and the charging and discharging state of the sub-modules, until the actual level of the bridge arm is equal to the desired level; when the calculated level is equal to the desired level, ending switching on and switching off control of the sub-modules, and executing step 9;

Next, the step of amplitude limiting replacement is as follows.

Step 9: determining whether the corresponding normalized voltages of the M1+M2 sub-modules in the switch-on and switch-off states exceed the voltage limits, specifically, if the sub-modules are in charging, when the normalized voltage of one sub-module in the switch-on state is greater than the voltage upper limit, executing step 10; when the normalized voltage of one sub-module in the switch-off state is less than the voltage lower limit, executing step 11; if the sub-modules are in discharging, when the normalized voltage of one sub-module in the switch-on state is less than the voltage lower limit, executing step 12; when the normalized voltage of one sub-module in the switch-off state is greater than the voltage upper limit, executing step 13.

Step 10: switching off such sub-module, selecting one or more sub-modules with low normalized voltages from the remaining sub-modules in the switch-off state to switch on according to the first voltage sequence and the second voltage sequence, and keeping the actual level of the bridge arm to be constant; then executing step 14;

Step 11: switching on such sub-module, selecting one or more sub-modules with high normalized voltages from the remaining sub-modules in the switch-on state to switch off according to the first voltage sequence and the second voltage sequence, and keeping the actual level of the bridge arm to be constant; then executing step 14;

Step 12: switching off such sub-module, selecting one or more sub-modules with high normalized voltages from the remaining sub-modules in the switch-off state to switch on according to the first voltage sequence and the second voltage sequence, and keeping the actual level of the bridge arm to be constant; then executing step 14;

Step 13: switching on such sub-module, selecting one or more sub-modules with low normalized voltages from the remaining sub-modules in the switch-on state to switch off according to the first voltage sequence and the second voltage sequence, and keeping the actual level of the bridge arm to be constant; then executing step 14;

Step 14: end.

Second Example: hereinafter taking R=2 (i.e., total two groups), $U_{M1}$=2 KV, $U_{M2}$=3 KV, MIN=2 KV, STD=6 KV, INTER_1=1 KV and INTER_2=2 KV as example to describe how to increase level numbers of the system, and reduce THD of the system through the control method of the disclosure is explained in detail.

Step 1: assuming that in one bridge arm, the number of sub-modules in the module 1 is M1, the number of sub-modules in the module 2 is M2, the reference capacitor voltage of the sub-modules in the module 1 is $U_{M1}$=2 KV, and the reference capacitor voltage of the sub-modules in the module 2 is $U_{M2}$=3 KV, and thus MIN=2 KV, STD=6 KV, INTER_1=1 KV, INTER_2=2 KV, the voltage upper limit is $U_{up\_limit}$, and the voltage lower limit is $U_{down\_limit}$.

Step 2: sorting the actual capacitor voltage $U_{M1\_x}$ (x=1, 2 . . . M1, which represents the x-th sub-module in the module 1) of the M1 sub-modules in the module 1 to obtain the first voltage sequence.

Step 3: sorting the actual capacitor voltage $U_{M2\_x}$ (x=1, 2 . . . M2, which represents the x-th sub-module in the module 2) of the M2 sub-modules in the module 2 to obtain the first voltage sequence.

Step 4: normalizing the actual capacitor voltage of the M1 sub-modules in the module 1 into a corresponding normalized voltage according to the normalized coefficient STD, i.e., multiplying $U_{M1\_x}$ by STD/$U_{M1}$ to obtain 3*$U_{M1\_x}$, and converting the actual capacitor voltage of the M2 sub-modules in the group 2 into a corresponding normalized voltage, i.e., multiplying $U_{M2\_x}$ by STD/$U_{M2}$ to obtain 2*$U_{M2\_x}$, thereby sorting the normalized voltages of the M1+M2 sub-modules among the groups to obtain the second voltage sequence.

Step 5: generating the desired level using 1 KV(INTER_1) and 2 KV(INTER_2) as the step;

Step 6: obtaining the desired level according to closed-loop control, wherein the desired level changes by taking a result after combining one or two of INTER_1=1 KV and INTER_2=2 KV as the step, determining value of the initial level and the desired level, and if the initial level is less than the desired level, executing step 7; if the initial level is greater than the desired level, executing step 8; if the initial level is equal to the desired level, executing step 9;

Since steps 7 and 8 are to determine the sub-modules to be switched on or switched off according to the charging and discharging states of the sub-modules, the first voltage sequence and the second voltage sequence, until the actual level of the bridge arm is consistent with the desired level, and thus the step is the same as the steps 7 and 8 in the first example, so the details are not described here.

Further, in order to ensure the actual capacitor voltages of all sub-modules to keep within a certain voltage range to realize better voltage equalization effect, the step of replacement also can be added.

Since replacement of the second example is the same as that of the first example (i.e., referring to steps 9-14 in the first example), the details are not described here.

Figure 13A:
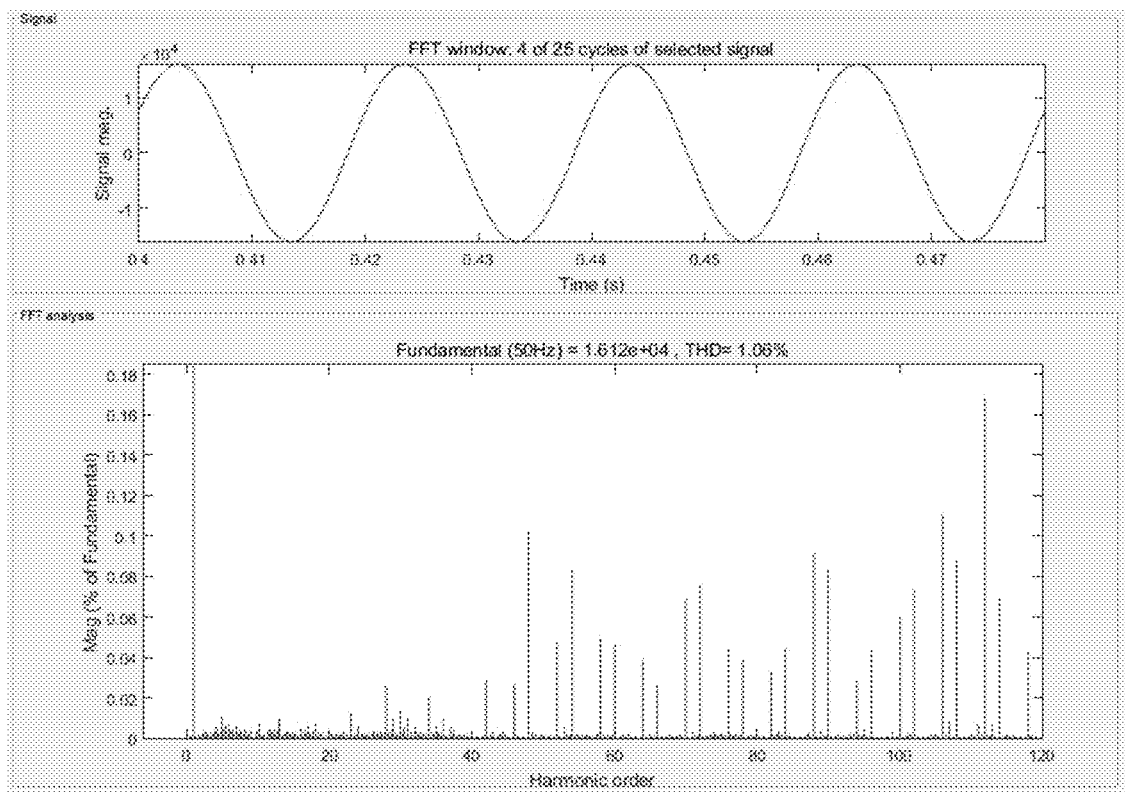
FIG. 13A illustrates a waveform of line voltages at AC side of the MMC under a traditional control method, wherein THD=1.06%.
Figure 13B:
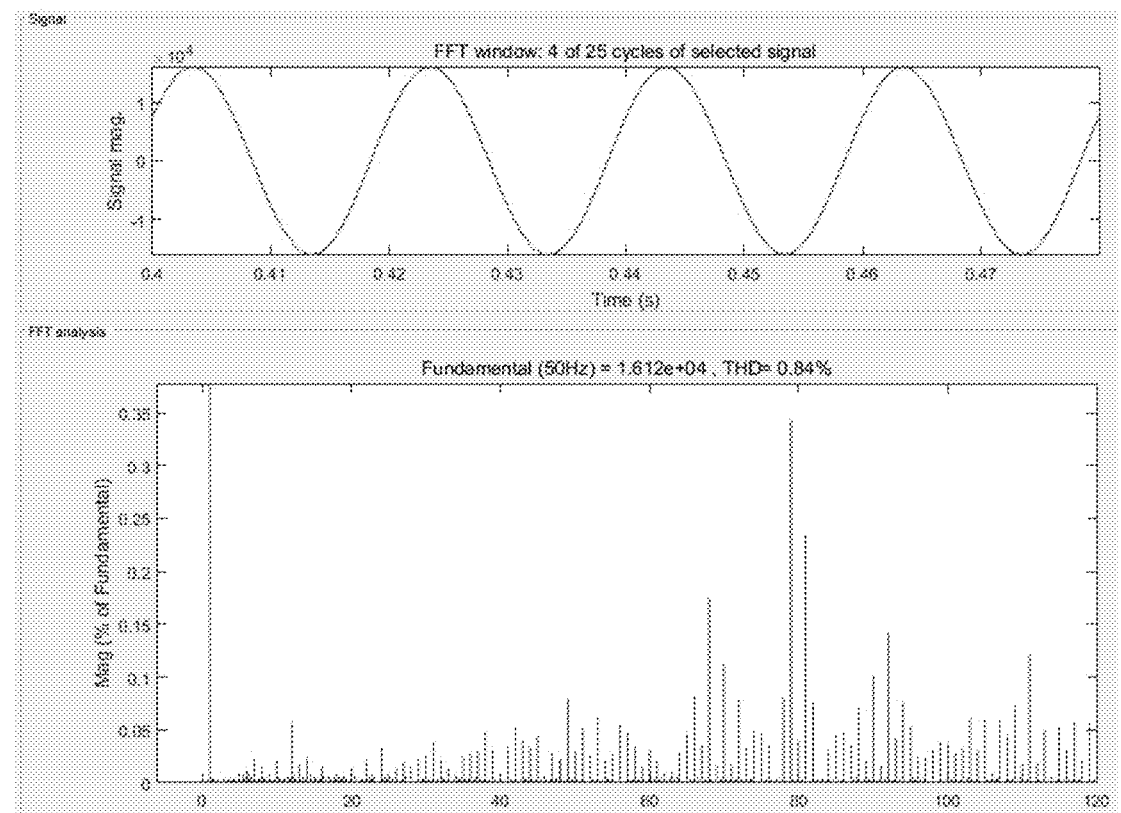
FIG. 13B illustrates a waveform of line voltages at AC side of the MMC under the control method of the disclosure, wherein THD=0.84%.

Controlling strategy effect of the method of increasing level of the Modular Multilevel Converter (MMC) is shown in FIGS. 13A and 13B, where simulation is performed on the basis of taking R=2 (i.e., total two groups), $U_{M1}$=960V, $U_{M2}$=1920V, STD=1920V, M1=8 and M2=8 as example. FIG. 13A illustrates a waveform of line voltages at an AC side of the MMC under a traditional control method, wherein THD=1.06%, and FIG. 13B illustrates a waveform of line voltages under the control method for increasing level according to the disclosure, wherein THD=0.84%.

By using the control method of the disclosure, it is possible to increase the level numbers of the system, improve THD, and enhance module utilization and system reliability.

Exemplary embodiments of the disclosure have been shown and described above. It shall be understood that the disclosure is not limited to the disclosed embodiments. Instead, the disclosure intends to cover various modifications and equivalent settings included in the spirit and scope of the appended claims.

What is claimed is:

1. A control method for a modular multilevel converter, the modular multilevel converter comprising a bridge arm circuit comprising at least one bridge arm, each of the bridge arms comprising a plurality of sub-modules connected in series, each of the sub-modules comprising one or more power conversion circuits connected in series, and each of the power conversion circuits comprising a capacitor, wherein the control method comprises:

detecting an actual voltage of the capacitor of each of the power conversion circuits in each of the sub-modules, and calculating an actual capacitor voltage of each of the sub-modules;

calculating a reference capacitor voltage of each of the sub-modules according to a reference voltage of the capacitor of each of the power conversion circuits in each of the sub-modules;

dividing the plurality of sub-modules in the bridge arm into R modules according to the reference capacitor voltage, the R is an integer greater than or equal to 1, wherein reference capacitor voltages of each sub-modules in the same module are the same, and reference capacitor voltages of sub-modules from different modules are different;

sorting the actual capacitor voltages of each sub-modules in the same module to obtain a first voltage sequence;

normalizing, in different modules, the actual capacitor voltage of each sub-modules into a corresponding normalized voltage, and sorting the normalized voltages of all sub-modules in the bridge arms among different modules to obtain a second voltage sequence; and determining sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in switch-on state within the bridge arm, and the desired level changes taking an insert value selected from a combination of one or more elements in a collection {$INTER_k$} as a step.

2. The control method according to claim 1, wherein each of the elements in the collection {$INTER_k$} satisfies:

$$INTER_k = X_1 * U_1 + X_2 * U_2 + \ldots + X_i * U_R,$$

wherein $U_R$ is the reference capacitor voltage corresponding to the sub-modules in the R-th module, and $X_1$, $X_2$, . . . , $X_i$ are all integers, and $INTER_k$ satisfies $0 < INTER_k \leq \min(U_1, U_2, \ldots, U_R)$.

3. The control method according to claim 1, wherein calculating, among different modules, a normalized coefficient according to the reference capacitor voltage of sub-module corresponding to each module, and normalizing the actual capacitor voltage of each of the sub-modules into the corresponding normalized voltage according to the normalized coefficient.

4. The control method according to claim 1, wherein determining the sub-modules to be switched on or switched off according to the charging and discharging states of each sub-module, the first voltage sequence and the second voltage sequence comprises:

when an initial level of the bridge arm is less than the desired level, if the sub-modules are in charging state, selecting the sub-module with a minimum normalized voltage to switch on according to the second voltage sequence; if the sub-modules are in discharging state, selecting the sub-module with a maximum normalized voltage to switch on according to the second voltage sequence;

when the initial level of the bridge arm is greater than the desired level, if the sub-modules are in charging state, selecting the sub-module with a maximum normalized voltage to switch off according to the second voltage sequence; if the sub-modules are in discharging state, selecting the sub-module with a minimum normalized voltage to switch off according to the second voltage sequence.

5. The control method according to claim 4, after determining the sub-modules to be switched on, further comprising:

obtaining a calculated level of the bridge arm according to the actual capacitor voltages of the sub-modules in the switch-on state;

when the calculated level is less than the desired level,
if the sub-modules are in charging state, continuing to select the sub-module with a minimum normalized voltage to switch on according to the second voltage sequence, until the actual level of the bridge arm is greater than or equal to the desired level;
if the sub-modules are in discharging state, continuing to select the sub-module with a maximum normalized voltage to switch on according to the second voltage sequence, until the actual level of the bridge arm is greater than or equal to the desired level;

when the calculated level is greater than the desired level,
if the sub-modules are in charging state, selecting, according to the first voltage sequence and the second voltage sequence, at least one sub-module with high actual capacitor voltage in at least one module to switch off, or selecting at least one sub-module with low actual capacitor voltage in at least one group to switch on while selecting at least one sub-module with high actual capacitor voltage in at least one module to switch off;
if the sub-modules are in discharging state, selecting, according to the first voltage sequence and the second voltage sequence, at least one sub-module with low actual capacitor voltage in at least one module to switch off, or selecting at least one sub-module with high actual capacitor voltage in at least one module to switch on while selecting at least one sub-module with low actual capacitor voltage in at least one module to switch off;

when the actual level of the bridge arm is equal to the desired level, ending switching on and switching off of the sub-modules.

6. The control method according to claim 4, after determining the sub-modules to be switched off, further comprising:

obtaining a calculated level of the bridge arm according to the actual capacitor voltages of the sub-modules in the switch-on state;

when the calculated level is greater than the desired level,
if the sub-modules are in charging state, continuing to select the sub-module with a maximum normalized voltage to switch off according to the second voltage sequence, until the actual level of the bridge arm is less than or equal to the desired level;
if the sub-modules are in discharging state, continuing to select the sub-module with a minimum normalized voltage to switch off according to the second voltage sequence, until the actual level of the bridge arm is less than or equal to the desired level;

when the calculated level is less than the desired level,
if the sub-modules are in charging state, selecting, according to the first voltage sequence and the second voltage sequence, at least one sub-module with low actual capacitor voltage in at least one module to switch on, or selecting at least one sub-module with low actual capacitor voltage in at least one module to switch on while selecting at least one sub-module with high actual capacitor voltage in at least one module to switch off;
if the sub-modules are in discharging state, selecting, according to the first voltage sequence and the second voltage sequence, at least one sub-module with high actual capacitor voltage in at least one module to switch on, or selecting at least one sub-module with high actual capacitor voltage in at least one module to switch on while selecting at least one sub-module with low actual capacitor voltage in at least one module to switch off;

when the actual level of the bridge arm is equal to the desired level, ending switching on and switching off of the sub-modules.

7. The control method according to claim 1, after determining the sub-modules to be switched on or switched off according to the charging and discharging states of each sub-module, the first voltage sequence and the second voltage sequence, further comprising:

when the normalized voltage of one of the plurality of sub-modules is greater than a voltage upper limit, or less than a voltage lower limit, replacing the sub-module by at least one sub-module selected from remaining of the plurality of sub-modules according to the charging and discharging states of the sub-module, the first voltage sequence and the second voltage sequence, such that the actual level of the bridge arm keeps constant.

8. The control method according to claim 7, wherein the step of replacing one of the plurality of sub-modules by least one of sub-module selected from remaining of the sub-modules according to the charging and discharging states of the sub-module, the first voltage sequence and the second voltage sequence when the normalized voltage of the one of the plurality of sub-modules is greater than a voltage upper limit, or less than a voltage lower limit comprises:

if the sub-modules are in charging state, when the normalized voltage of one of the plurality of sub-modules in the switch-on state is greater than the voltage upper limit, switching off the sub-module, and selecting at least one of the remaining of the plurality of sub-modules to replace the sub-module according to the first voltage sequence and the second voltage sequence, such that the actual level of the bridge arm keeps constant;

if the sub-modules are in charging state, when the normalized voltage of one of the plurality of sub-modules in a switch-off state is less than the voltage lower limit, switching on the sub-module, and selecting at least one of the remaining of the plurality of sub-modules to replace the sub-module according to the first voltage sequence and the second voltage sequence, such that the actual level of the bridge arm keeps constant;

if the sub-modules are in discharging state, when the normalized voltage of one of the plurality of sub-modules in the switch-on state is less than the voltage lower limit, switching off the sub-module, and selecting at least one of the remaining of the plurality of sub-modules to replace the sub-module according to the first voltage sequence and the second voltage sequence, such that the actual level of the bridge arm keeps constant;

if the sub-modules are in discharging state, when the normalized voltage of one of the plurality of sub-modules in the switch-off state is greater than the voltage upper limit, switching on the sub-module, and selecting at least one of the remaining of the plurality of sub-modules to replace the sub-module according to the first voltage sequence and the second voltage sequence, such that the actual level of the bridge arm keeps constant.

9. A control system for a modular multilevel converter, the modular multilevel converter comprising a bridge arm circuit comprising at least one bridge arm, each of the bridge arms comprising a plurality of sub-modules connected in series, each of the sub-modules comprising one or more power conversion circuits connected in series, and each of the power conversion circuits comprising a capacitor, wherein the control system comprises:

a detection unit for detecting an actual voltage of the capacitor of each of the power conversion circuits in each of the sub-modules, and calculating an actual capacitor voltage of each of the sub-modules; while calculating a reference capacitor voltage of each of the sub-modules according to a reference voltage of the capacitor of each of the power conversion circuits in each of the sub-modules;

a grouping unit for dividing the plurality of sub-modules in the bridge arm into R modules according to the reference capacitor voltage, where R is an integer greater than or equal to 1, wherein reference capacitor voltages of the respective sub-modules in the same module are the same, and reference capacitor voltages of the sub-modules from different modules are different;

a sorting unit for sorting the actual capacitor voltages of the respective sub-modules in the same module to obtain a first voltage sequence; and, among different modules, normalizing the actual capacitor voltage of each of the sub-modules into a corresponding normalized voltage, and sorting the normalized voltages of all sub-modules in the bridge arms to obtain a second voltage sequence; and a modulation algorithm unit for determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state within the bridge arm, and the desired level changes taking an insert value selected from a combination of one or more elements in a collection $\{INTER_k\}$ as a step.

10. The control system according to claim 9, wherein each of the elements in the collection $\{INTER_k\}$ satisfies:

$$INTER_k = X_1 * U_1 + X_2 * U_2 + \ldots + X_i * U_R,$$

wherein $U_R$ is the reference capacitor voltage corresponding to the sub-modules in the R-th module, and $X_1$, $X_2$, ..., $X_i$ are all integers, and $INTER_k$ satisfies $0 < INTER_k \leq \min(U_1, U_2, \ldots, U_R)$.

11. The control system according to claim 9, wherein a normalized coefficient is calculated according to the reference capacitor voltage of the corresponding sub-module of each module, and the actual capacitor voltage of each of the sub-modules is converted into the corresponding normalized voltage according to the normalized coefficient among different modules.

12. The control system according to claim 9, wherein the modulation algorithm unit is configured for:

when an initial level of the bridge arm is less than the desired level,
if the sub-modules are in charging state, selecting the sub-module with a minimum normalized voltage to switch on according to the second voltage sequence;
if the sub-modules are in discharging state, selecting the sub-module with a maximum normalized voltage to switch on according to the second voltage sequence;

when the initial level of the bridge arm is greater than the desired level,
if the sub-modules are in charging state, selecting the sub-module with a maximum normalized voltage to switch off according to the second voltage sequence;
if the sub-modules are in discharging state, selecting the sub-module with a minimum normalized voltage to switch off according to the second voltage sequence.

13. The control system according to claim 12, wherein the modulation algorithm unit is further configured for:

obtaining a calculated level of the bridge arm according to the actual capacitor voltages of the sub-modules in the switch-on state after the sub-modules are switched on;
when the calculated level is less than the desired level,
if the sub-modules are in charging state, continuing to select the sub-module with a minimum normalized voltage to switch on according to the second voltage sequence, until the actual level of the bridge arm is greater than or equal to the desired level;
if the sub-modules are in discharging state, continuing to select the sub-module with a maximum normalized voltage to switch on according to the second voltage sequence, until the actual level of the bridge arm is greater than or equal to the desired level;
when the calculated level is greater than the desired level,
if the sub-modules are in charging state, selecting, according to the first voltage sequence and the second voltage sequence, at least one sub-module with high actual capacitor voltage in at least one module to switch off, or selecting at least one sub-module with low actual capacitor voltage in at least one module to switch on while selecting at least one sub-module with high actual capacitor voltage in at least one module to switch off;
if the sub-modules are in discharging state, selecting, according to the first voltage sequence and the second voltage sequence, at least one sub-module with low actual capacitor voltage in at least one module to switch off, or selecting at least one sub-module with high actual capacitor voltage in at least one module to switch on while selecting at least one sub-module with low actual capacitor voltage in at least one module to switch off;

when the actual level of the bridge arm is equal to the desired level, ending switching on and switching off of the sub-modules.

14. The control system according to claim 12, wherein the modulation algorithm unit is further configured for:
obtaining a calculated level of the bridge arm according to the actual capacitor voltages of the sub-modules in the switch-on state after the sub-modules are switched off;
when the calculated level is greater than the desired level,
if the sub-modules are in charging state, continuing to select the sub-module with a maximum normalized voltage to switch off according to the second voltage sequence, until the actual level of the bridge arm is less than or equal to the desired level;
if the sub-modules are in discharging state, continuing to select the sub-module with a minimum normalized voltage to switch off according to the second voltage sequence, until the actual level of the bridge arm is less than or equal to the desired level;
when the calculated level is less than the desired level,
if the sub-modules are in charging state, selecting, according to the first voltage sequence and the second voltage sequence, at least one sub-module with low actual capacitor voltage in at least one module to switch on, or selecting at least one sub-module with low actual capacitor voltage in at least one module to switch on while selecting at least one sub-module with high actual capacitor voltage in at least one module to switch off;
if the sub-modules are in discharging state, selecting, according to the first voltage sequence and the second voltage sequence, at least one sub-module with high actual capacitor voltage in at least one module to switch on, or selecting at least one sub-module with high actual capacitor voltage in at least one module to switch on while selecting at least one sub-module with low actual capacitor voltage in at least one module to switch off;
when the actual level of the bridge arm is equal to the desired level, ending switching on and switching off of the sub-modules.

15. The control system according to claim 9, wherein the control system further comprises:
a replacement unit for replacing one of the plurality of sub-modules by at least one sub-modules selected from remaining of the plurality of sub-modules according to the charging and discharging states of the sub-module, the first voltage sequence and the second voltage sequence when the normalized voltage of the one of the plurality of sub-modules is greater than a voltage upper limit, or less than a voltage lower limit, such that the actual level of the bridge arm keeps constant.

16. The control system according to claim 15, wherein the replacement unit is specifically configured for:
if the sub-modules are in charging state, when the normalized voltage of one of the plurality of sub-modules in the switch-on state is greater than the voltage upper limit, switching off the sub-module, and selecting at least one of the remaining of the sub-modules to replace the sub-module according to the first voltage sequence and the second voltage sequence, such that the actual level of the bridge arm keeps constant;
if the sub-modules are in charging state, when the normalized voltage of one of the plurality of sub-modules in a switch-off state is less than the voltage lower limit, switching on the sub-module, and selecting at least one of the remaining of the plurality of sub-modules to replace the sub-module according to the first voltage sequence and the second voltage sequence, such that the actual level of the bridge arm keeps constant;
if the sub-modules are in discharging state, when the normalized voltage of one of the plurality of sub-modules in the switch-on state is less than the voltage lower limit, switching off the sub-module, and selecting at least one of the remaining of the sub-modules to replace the sub-module according to the first voltage sequence and the second voltage sequence, such that the actual level of the bridge arm keeps constant;
if the sub-modules are in discharging state, when the normalized voltage of one of the plurality of sub-modules in the switch-off state is greater than the voltage upper limit, switching on the sub-module, and selecting at least one of the remaining of the sub-modules to replace the sub-module according to the first voltage sequence and the second voltage sequence, such that the actual level of the bridge arm keeps constant.

17. The control system according to claim 9, wherein a bypass switch is connected in parallel with an output end of each of the power conversion circuits, when the bypass switch is on, the corresponding power conversion circuit is in a bypass mode, when the bypass switch is off, the corresponding power conversion circuit is in a connection mode, and the reference capacitor voltage of the sub-module is equal to a sum of the reference voltages of the capacitors of the power conversion circuits in the connection mode.

18. The control system according to claim 17, wherein, in the same sub-module, a same driving signal is used for all power conversion circuits in the connection mode.

19. A power transmission system, comprising:
a modular multilevel converter comprising a bridge arm circuit comprising at least one bridge arm, each of the bridge arms comprising a plurality of sub-modules connected in series, each of the sub-modules comprising one or more power conversion circuits connected in series, and each of the power conversion circuits comprising a capacitor; and
the control system according to claim 9.

20. The power transmission system according to claim 19, wherein each of the elements in the collection $\{INTER_k\}$ satisfies:

$$INTER_k = X_1 * U_1 + X_2 * U_2 + \ldots + X_i * U_R,$$

wherein $U_R$ is the reference capacitor voltage corresponding to the sub-modules in the R-th module, and $X_1, X_2, \ldots, X_i$ are all integers, and
$INTER_k$ satisfies $0 < INTER_k \leq \min(U_1, U_2, \ldots, U_R)$.

* * * * *